United States Patent
Yokoyama et al.

(10) Patent No.: US 8,791,895 B2
(45) Date of Patent: Jul. 29, 2014

(54) LIQUID CRYSTAL DISPLAY DEVICE AND DRIVE METHOD THEREFOR

(75) Inventors: Makoto Yokoyama, Osaka (JP); Shige Furuta, Osaka (JP); Yuhichiroh Murakami, Osaka (JP); Yasushi Sasaki, Osaka (JP); Seijirou Gyouten, Osaka (JP); Shuji Nishi, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 335 days.

(21) Appl. No.: 13/395,536

(22) PCT Filed: May 26, 2010

(86) PCT No.: PCT/JP2010/058918
§ 371 (c)(1),
(2), (4) Date: Mar. 21, 2012

(87) PCT Pub. No.: WO2011/033827
PCT Pub. Date: Mar. 24, 2011

(65) Prior Publication Data
US 2012/0176388 A1    Jul. 12, 2012

(30) Foreign Application Priority Data

Sep. 16, 2009  (JP) ................................. 2009-215065

(51) Int. Cl.
*G09G 3/36* (2006.01)
(52) U.S. Cl.
USPC .................... 345/99; 345/87; 345/94; 345/98

(58) Field of Classification Search
CPC .................... G09G 3/3618; G09G 2300/0426; G09G 2300/0439; G09G 2300/0842; G09G 2300/0852
USPC .................................................... 345/87–104
See application file for complete search history.

(56) References Cited

U.S. PATENT DOCUMENTS

| | | | |
|---|---|---|---|
| 6,778,162 B2 * | 8/2004 | Kimura et al. | .................. 345/90 |
| 7,230,597 B2 * | 6/2007 | Edwards et al. | ................. 345/87 |
| 2001/0024187 A1 | 9/2001 | Sato et al. | |
| 2002/0075205 A1 | 6/2002 | Kimura et al. | |

FOREIGN PATENT DOCUMENTS

| | | |
|---|---|---|
| EP | 0 631 271 | 12/1994 |
| JP | 05216443 A | 8/1993 |
| JP | 2002-132226 | 5/2002 |
| JP | 2002-229532 A | 8/2002 |
| JP | 2008-158189 | 7/2008 |

OTHER PUBLICATIONS

International Search Report and Written Opinion of Searching Authority.

* cited by examiner

*Primary Examiner* — Ilana Spar
(74) *Attorney, Agent, or Firm* — Harness, Dickey & Pierce, P.L.C.

(57) ABSTRACT

In a memory liquid crystal display device, a potential of a storage capacitor line signal (CS) supplied to the CS lines (CSL(i)) are once decreased ($\Delta$Vcs) while the gate lines (GL(i)) are made simultaneously active (period t4, period t10) in the data holding period (T2), and the potential of the storage capacitor line signal (CS) is made back to its original potential while the gate lines (GL(i)) are made simultaneously inactive and the refresh output control lines (RC(i)) are made active (period t5, period t11). This reduces flicker, thereby allowing for improvement in display quality of the memory liquid crystal display device.

10 Claims, 18 Drawing Sheets

LIQUID CRYSTAL DISPLAY DEVICE AND DRIVE METHOD THEREFOR

TECHNICAL FIELD

The present invention relates to a memory liquid crystal display device.

BACKGROUND ART

Flicker occurrence has been a problem with liquid crystal display devices, generally due to potential changes in pixel potentials caused by a gate-drain parasitic capacitor in a thin film transistor (Thin Film Transistor, hereinafter referred to as TFT), which TFT is provided for each pixel.

FIG. 16 illustrates an equivalent circuit of one pixel in a liquid crystal display device. As illustrated in FIG. 16, a source line 11 is provided for each column so as to be parallel to each other along a column direction (vertical direction), and a gate line 12 is provided for each row so as to be parallel to each other along a row direction (horizontal direction). A TFT 13 and a pixel electrode 14 are disposed associated with an intersection of the source line 11 and the gate line 12, and a source electrode s of the TFT 13 is connected to the source line 11, a gate electrode g of the TFT 13 is connected to the gate line 12, and a drain electrode d of the TFT 13 is connected to the pixel electrode 14. Further, a liquid crystal capacitor Clc is formed between the pixel electrode 14 and a common electrode (counter electrode) 19 in such a manner that a liquid crystal is sandwiched between the pixel electrode 14 and the common electrode 19.

A CS line 15 is provided for each row so as to be disposed parallel to each other along the row direction (horizontal direction), and is disposed so as to be paired with the gate line 12. A storage capacitor Ccs is formed between the CS line 15 and the pixel electrode 14 disposed on its corresponding row.

In the foregoing configuration, structurally, a feed-through capacitor (parasitic capacitor) Cgd is inevitably formed on the TFT 13 between its gate electrode g and drain electrode d; the parasitic capacitor Cgd causes a potential written into the pixel electrode to vary. FIG. 17 is a timing chart illustrating how the potential (pixel potential) of the pixel electrode 14 varies. FIG. 17 illustrates a state of an operation in which the TFT 13 is switched on to supply a data signal potential from the source line 11 to the pixel electrode 14, the TFT 13 is switched off after the data signal potential is supplied, and the supplied data signal potential is held until the TFT 13 is switched on the next time.

A variable potential (feed-through voltage) $\Delta V\text{pix}$ is represented by the following equation:

$$\Delta V\text{pix} = Cgd \cdot \Delta Vg/(Clc + Ccs + Cgd + Csd) \quad (1)$$

where Vgh is a gate on-state voltage, Vgl is a gate off-state voltage, $\Delta Vg$ is a difference therebetween (Vgh−Vgl), and Csd is a parasitic capacitor between the source electrode s and the drain electrode d.

One method of reducing the flicker that occurs due to the feed-through voltage $\Delta V\text{pix}$ is to set (shift) a common electrode potential (counter potential) Vcom in accordance with $\Delta V\text{pix}$. FIG. 17 illustrates a state in which the counter potential Vcom is shifted in accordance with $\Delta V\text{pix}$. More specifically, the counter potential Vcom is set in view of $\Delta V\text{pix}$, so that a potential difference between the pixel potential and the counter potential Vcom in a positive drive becomes equal to a potential difference between the pixel potential and the counter potential Vcom in a negative drive. This counter potential Vcom is called an optimum counter potential Vcom.

As a result, it is possible to carry out display with identical brightness in the positive drive and the negative drive, and thus allows for reducing the flicker.

CITATION LIST

Patent Literature

Patent Literature 1
Japanese Patent Application Publication, Tokukai, No. 2002-229532 A (Publication Date: Aug. 16, 2002)

SUMMARY OF INVENTION

Technical Problem

However, in the conventional method, the optimum counter potential Vcom does not agree between a case in which a potential corresponding to a white display is written in and a case in which a potential corresponding to a black display is written in; this causes the problem that the flicker occurs at a predetermined tone. The following description explains a cause of disagreement of the optimum counter potential Vcom between the white display and the black display, with reference to FIG. 18. FIG. 18 is a timing chart illustrating a state in which the optimum counter potentials Vcom are in disagreement.

Generally, a capacitance of the liquid crystal capacitor Clc is different between when the liquid crystal is on and when the liquid crystal is off. The following description shows an example a case of a normally black display. In this case, when the liquid crystal is on, the display carries out white display, and when the liquid crystal is off, the display carries out black display.

$\Delta V\text{pix}\_\text{on}$ and $\Delta V\text{pix}\_\text{off}$ are represented by the following equations, respectively:

$$\Delta V\text{pix}\_\text{on} = Cgd \cdot \Delta Vg/(Clc\_\text{on} + Ccs + Cgd + Csd) \quad (2)$$

$$\Delta V\text{pix}\_\text{off} = Cgd \cdot \Delta Vg/(Clc\_\text{off} + Ccs + Cgd + Csd) \quad (3)$$

where Clc_on and $\Delta V\text{pix}\_\text{on}$ are a liquid crystal capacitor and a feed-through voltage, respectively, each when the liquid crystal is on, and Clc_off and $\Delta V\text{pix}\_\text{off}$ are a liquid crystal capacitor and a feed-through voltage, respectively, each when the liquid crystal is off.

As shown by the equations (2) and (3), when the liquid crystal capacitors Clc differ, the feed-through voltages $\Delta V\text{pix}$ also differ. As described above, since the optimum counter potential Vcom is set in accordance with the feed-through voltage $\Delta V\text{pix}$, a disagreement in the feed-through voltages $\Delta V\text{pix}$ between that when a voltage is applied and that when no voltage is applied results in the disagreement of the optimum counter potentials Vcom.

Generally, the liquid crystal capacitor Clc_on when the liquid crystal is on is greater than the liquid crystal capacitor Clc_off when the liquid crystal is off (Clc_on>Clc_off). Thus, $\Delta V\text{pix}\_\text{on}$ is smaller than $\Delta V\text{pix}\_\text{off}$. As a result, Vcom_on is greater than Vcom_off, where Vcom_on is the optimum counter potential when the liquid crystal is on and Vcom_off is the optimum counter potential when the liquid crystal is off.

More specifically, in a case in which the liquid crystal capacitor Clc_on is 100 fF, the liquid crystal capacitor Clc_off is 50 fF, the storage capacitor Ccs is 200 fF, a gate-drain parasitic capacitor Cgd is 10 fF, a source-drain parasitic capacitor Csd is 10 fF, and $\Delta Vg$ is 15V, the equations (2) and (3) calculate to obtain values as follows:

ΔVpix_on=0.469 V

ΔVpix_off=0.556 V.

The above result shows that a difference between the feed-through voltages is approximately 0.1 V. Hence, for example, if the optimum counter potential Vcom is set based on a halftone display, i.e. is set to a value shifted by 0.5 V to a lower (Low) side of a center potential ((Vgh+Vgl)/2), the feed-through voltage shifts by −0.031 V in the white display whereas the feed-through voltage shifts by +0.056 V in the black display. In this case, the farther the pixel potential is from the center potential (the larger the pixel potential of the white write-in is, or the smaller the pixel potential of the black write-in is), the larger the disagreement of the optimum counter potentials Vcom is. Moreover, if the optimum counter potential Vcom is set based on a white tone display, i.e. is set to a value shifted by 0.469 V to the lower side of the center potential, the feed-through voltage shifts by 0.1 V in the black display. In this case, the farther the pixel potential is from the center potential (the smaller the pixel potential of the black write-in is), the larger the disagreement of the optimum counter potentials Vcom is.

As such, the capacitance of the liquid crystal capacitor Clc differ between when the liquid crystal is on and when the liquid crystal is off, and thus the optimum counter potentials Vcom cannot be agreed, thereby causing the flicker to be more visible in a predetermined tone.

The foregoing problem is remarkable particularly with a liquid crystal display device including a pixel memory (memory liquid crystal display device) (e.g. Patent Literature 1). A memory liquid crystal display device once holds image data written into its pixels and thereafter displays the image data by carrying out a refresh operation while inverting the polarity of the image data (memory operation mode). In regular operation (normal operation mode, multicolor display mode) in which multicolor (multiple tone) display is carried out, the pixels are rewritten with new image data per frame via a data signal line, whereas in the memory operation mode, since the image data held in a memory circuit (pixel memory) is used, there is no need to supply, to the data signal line, image data for rewriting images, while the refresh operation is being carried out.

Accordingly, since the memory operation mode allows for stopping the operation of the circuit that drives the scanning signal lines and data signal lines, power consumption can be reduced. Furthermore, it is possible to reduce power consumption by (i) reducing the number of times a data signal line having a large capacity is charged and discharged and (ii) not requiring transmitting to a controller of image data that corresponds to the memory operation period.

Such a memory liquid crystal display device is driven based on two values; this causes the optimum counter potentials Vcom to disagree between that of the white display and that of the black display. As a result, the deterioration in display quality caused by the flicker is remarkable.

The present invention is accomplished in view of the foregoing problem, and proposes a configuration in a memory liquid crystal display device, which allows for improving its display quality by reducing flicker.

Solution to Problem

In order to attain the object, a liquid crystal display device of the present invention is a memory liquid crystal display device that carries out a refresh operation in a period in which data is held after a data signal potential is written in, the device including: data signal lines; scanning signal lines; storage capacitor lines; data transfer lines; refresh lines; pixel electrodes; a counter electrode; first transistors, each of whose control terminal is connected to a respective one of the scanning signal lines; second transistors, each of whose control terminal is connected to a respective one of the data transfer lines; third transistors, each of whose control terminal is connected to a respective one of the pixel electrodes via a respective one of the second transistors; fourth transistors, each of whose control terminal is connected to a respective one of the refresh lines; first storage capacitors, each of which is connected to a respective one of the pixel electrodes; and second storage capacitors, each of which is connected to a respective one of the pixel electrodes via a respective one of the second transistors, each of the pixel electrodes being connected to a respective one of the data signal lines via a respective one of the first transistors and being connected to a respective one of the data transfer lines via a respective one of the third transistors and a respective one of the fourth transistors, and during the period in which the data is held, a storage capacitor line signal supplied to the storage capacitor lines once being decreased in potential while the scanning signal lines are simultaneously active, and having the potential of the storage capacitor line signal be back to its original potential during a period after the scanning signal lines are made simultaneously inactive but before the refresh lines are made active.

According to the configuration, an effect similar to the liquid crystal display device is achieved.

Advantageous Effects of Invention

As described above, a liquid crystal display device and a method of driving the liquid crystal display device, each according to the present invention, includes: data signal lines; scanning signal lines; storage capacitor lines; data transfer lines; refresh lines; pixel electrodes; a counter electrode; first transistors, each of whose control terminal is connected to a respective one of the scanning signal lines; second transistors, each of whose control terminal is connected to a respective one of the data transfer lines; third transistors, each of whose control terminal is connected to a respective one of the pixel electrodes via a respective one of the second transistors; fourth transistors, each of whose control terminal is connected to a respective one of the refresh lines; first storage capacitors, each of which is connected to a respective one of the pixel electrodes; and second storage capacitors, each of which is connected to a respective one of the pixel electrodes via a respective one of the second transistors, each of the pixel electrodes being connected to a respective one of the data signal lines via a respective one of the first transistors and being connected to a respective one of the data transfer lines via a respective one of the third transistors and a respective one of the fourth transistors, and during the period in which the data is held, a storage capacitor line signal supplied to the storage capacitor lines once being decreased in potential while the scanning signal lines are simultaneously active, and having the potential of the storage capacitor line signal be back to its original potential during a period after the scanning signal lines are made simultaneously inactive but before the refresh lines are made active.

This allows for reducing the flicker in a memory liquid crystal display device, which makes it possible to improve display quality thereof.

BRIEF DESCRIPTION OF DRAWINGS

FIG. 1 is a block diagram illustrating a configuration of a liquid crystal display device according to the present embodiment.

FIG. 2 is a block diagram illustrating a configuration of a pixel memory in the present liquid crystal display device.

FIG. 3 is a view illustrating operations of the pixel memory of FIG. 2, and (a) through (h) thereof illustrate each of the operations.

FIG. 4 is a circuit diagram illustrating a configuration of a pixel memory in the present liquid crystal display device.

FIG. 5 is a timing chart for explaining operations in Example 1, of the pixel memory illustrated in FIG. 4.

FIG. 6 is a timing chart illustrating other operations in the operations of FIG. 5.

FIG. 7 is a timing chart illustrating a state of a case in which optimum counter potentials Vcom disagree in the pixel memory illustrated in FIG. 4.

FIG. 8 is a timing chart illustrating operations corresponding to a pixel of Example 1, in the pixel memory illustrated in FIG. 4.

FIG. 9 is a timing chart for explaining an idea of the present invention.

FIG. 10 is a timing chart for explaining operations of Example 2, in the pixel memory illustrated in FIG. 4.

FIG. 11 is a circuit diagram for explaining operations of Example 2, in the pixel memory illustrated in FIG. 4.

FIG. 12 is a circuit diagram for explaining operations of Example 2, in the pixel memory illustrated in FIG. 4.

FIG. 13 is a timing chart illustrating a state of a case in which optimum counter potentials Vcom disagree in the pixel memory illustrated in FIG. 4.

FIG. 14 is a timing chart illustrating operations that correspond to a pixel of Example 2, in a pixel memory illustrated in FIG. 4.

FIG. 15 is a timing chart for describing an idea of the present invention.

FIG. 16 is a circuit diagram illustrating a configuration of a pixel in a conventional liquid crystal display device.

FIG. 17 is a timing chart illustrating a change in potential (pixel potential) of a pixel electrode in FIG. 16.

FIG. 18 is a timing chart illustrating a state of a case in which optimum counter potentials Vcom disagree in the pixel illustrated in FIG. 16.

DESCRIPTION OF EMBODIMENTS

Figure 1:
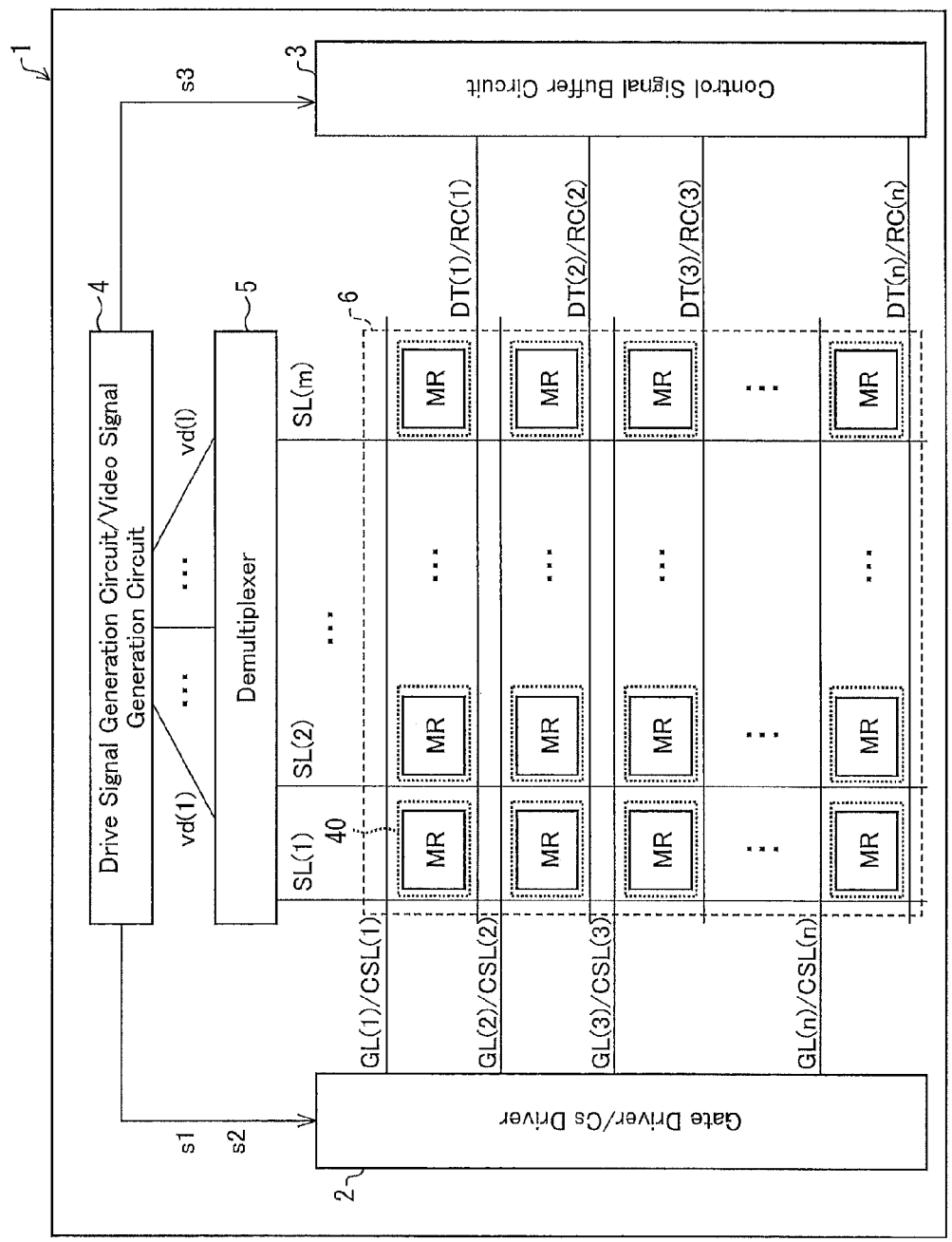
FIG. 1

One embodiment of the present invention is described below with reference to drawings. FIG. 1 illustrates a configuration of a liquid crystal display device according to the present embodiment. The present liquid crystal display device 1 is a memory liquid crystal display device including a liquid crystal panel provided with a memory circuit (pixel memory MR), which device performs a refresh operation during a data holding period that follows a write-in of a data signal potential. The liquid crystal display device 1 operates by switching over between (a) a multicolor (multiple tone) display mode (normal operation mode) used in a screen display or the like while a portable phone is being operated and (b) a memory operation mode used in a screen display or the like while the portable phone is in standby.

The liquid crystal display device 1 includes a gate driver/CS driver 2 (scanning signal line drive circuit/storage capacitor line drive circuit), a control signal buffer circuit 3, a drive signal generation circuit/video signal generation circuit 4 (display control circuit), a demultiplexer 5, and a pixel array 6. The liquid crystal display device 1 further includes gate lines (scanning signal line) GL(i), CS lines (storage capacitor line) CSL(i), data transfer control lines (data transfer line) DT(i), refresh output control lines (refresh line) RC(i), source lines (data signal line) SL(j), and output signal lines vd(k). Note that "i" is an integer in a range of $1 \le i \le n$, "j" is an integer of $1 \le j \le m$, and "k" is an integer of $1 \le k \le l < m$.

The pixel array 6 is configured in such a manner that pixels 40 each having a pixel memory MR (memory circuit) are disposed in a matrix of n rows and m columns. Each of the pixel memories MR independently holds image data. The gate lines GL(i), the data transfer control lines DT(i), the refresh output control lines RC(i), the CS lines CSL(i), and the source lines SL(j) are arranged so as to be associated with corresponding pixel memories MR each located at an intersection of a row i and a column j.

The gate driver/CS driver 2 is a drive circuit which drives the pixels 40 for the n number of rows, through the gate lines GL(i) and the CS lines CSLi. The gate lines GL(i) and the CS lines CSL(i) are connected to the corresponding pixels 40 in the ith row.

The control signal buffer circuit 3 is a drive circuit that drives the pixels 40 in the n rows, through the data transfer control lines DT(i) and the refresh output control lines RC(i).

The drive signal generation circuit/video signal generation circuit 4 is a control drive circuit for carrying out image display and memory operation, and may also serve as a circuit not just for generating a timing for use in the memory operation but also as a circuit for generating timing of a gate start pulse, a gate clock, a source start pulse, a source clock and the like which are used in the display operations.

During the multicolor display mode (while the memory circuit is not operating), the drive signal generation circuit/video signal generation circuit 4 outputs a multiple tone video signal from a video output terminal, and drives the source lines SL(j) through the output signal lines vd(k) and the demultiplexer 5. Moreover, the drive signal generation circuit/video signal generation circuit 4 simultaneously outputs a signal s1 which drives and controls the gate driver/CS driver 2. This allows for writing in the display data to the pixels 40 and displaying a multiple tone.

Moreover, during the memory circuit operation mode, the drive signal generation circuit/video signal generation circuit 4 (i) sends out the data to be held in the pixels 40 from the video output terminal to the source lines SL(j) through the output signal lines vd(k) (k is an integer of $1 \le k \le l < m$) and the demultiplexer 5, (ii) outputs a signal s2 which drives and controls the gate driver/CS driver 2, and (iii) outputs a signal s3 which drives and controls the control signal buffer circuit 3. This allows for writing in data to display and hold the data in the pixels 40 and for reading out the data held in the pixels 40.

The data written into the pixels 40 and held in the memory circuit may just be used for display, and thus a read-out operation from the pixels 40 does not necessarily need to be carried out. The data outputted from the video output terminal to the output signal lines vd(k) in the drive signal generation circuit/video signal generation circuit 4 during the memory circuit operation mode is of a binary logic level given by a first potential level and a second potential level. If the pixels 40 correspond to the pixels of the color display, display is possible with the number of colors calculated by exponentiating two (2) by the number of colors of the pixel. For instance, if the pixel has three colors of RGB, display is possible in a display mode of eight colors (two by the power of three).

The demultiplexer 5 sorts data outputted to the output signal lines vd(k) to its corresponding source lines SL(j), and outputs the data.

Figure 2:
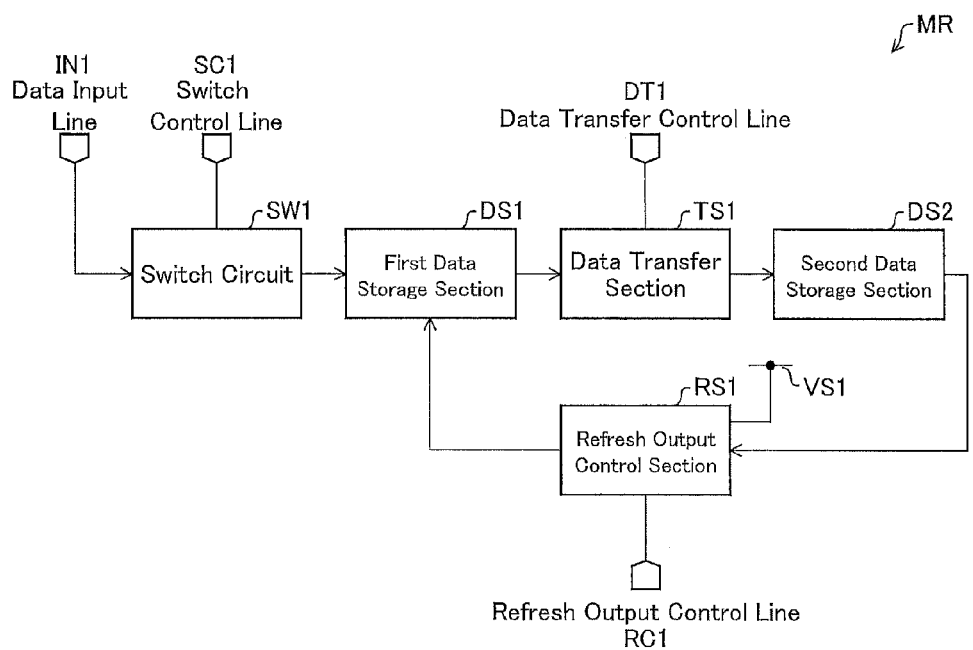
FIG. 2

FIG. 2 illustrates a concept of the configuration of the pixel memories MR.

The pixel memory MR includes a switch circuit SW1, a first data storage section DS1, a data transfer section TS1, a second data storage section DS2, a refresh output control section RS1, and a supply source VS1.

Moreover, the pixel memory MR includes a data input line IN1 corresponding to the source line SL(1), a switch control line SC1 corresponding to the gate line GL(1), a data transfer control line DT1, and a refresh output control line RC1.

The switch circuit SW1 selectively switches between a state in which the data input line IN1 and the first data storage section DS1 are electrically connected to each other and a state in which the data input line IN1 and the first data storage section DS1 are electrically disconnected to each other, by the switch circuit SW1 being driven by the gate driver/CS driver 2 through the switch control line SC1.

The first data storage section DS1 stores a binary logic level that is inputted into the first data storage section DS1.

The data transfer section DT1 selectively carries out (i) a transfer operation, which transfers the binary logic level stored in the first data storage section DS1 to the second data storage section DS2 in such a manner that the first data storage section DS1 still stores the binary logic level, by the data transfer section DT1 being driven by the control signal buffer circuit 3 through the data transfer control line DT1, or (ii) a non-transfer operation in which no transfer operation is carried out. The signal supplied to the data transfer control line DT1 is common for all pixel memories MR; the data transfer control line DT1 is not necessarily provided on each row and driven by the control signal buffer circuit 3, and may be driven by the drive signal generation circuit/video signal generation circuit 4 or by another member.

The second data storage section DS2 stores a binary logic level inputted into the second data storage section DS2.

The refresh output control section RS1 is selectively controlled in a state for carrying out a first operation or a state for carrying out a second operation, by being driven by the control signal buffer circuit 3 through the refresh output control line RC1. The signal supplied to the refresh output control line RC1 is common for all the pixel memories MR; the refresh output control line RC1 is not necessarily provided on each row and driven by the control signal buffer circuit 3, and may be driven by the drive signal generation circuit/video signal generation circuit 4 or another member.

The first operation is an operation of selecting either of an active state or an inactive state depending on control information of whether the binary logic level stored in the second data storage section DS2 is of the first potential level or of the second potential level; the active state is a state in which an input to the refresh output control section RS1 is taken in and supplied to the first data storage section DS1 as an output of the refresh output control section RS1, and the inactive state is a state in which outputting of the refresh output control section RS1 is stopped.

The second operation is an operation of stopping the outputting of the refresh output control section RS1, regardless of the control information.

The supply source VS1 supplies a set potential to the input of the refresh output control section RS1.

Figure 3:
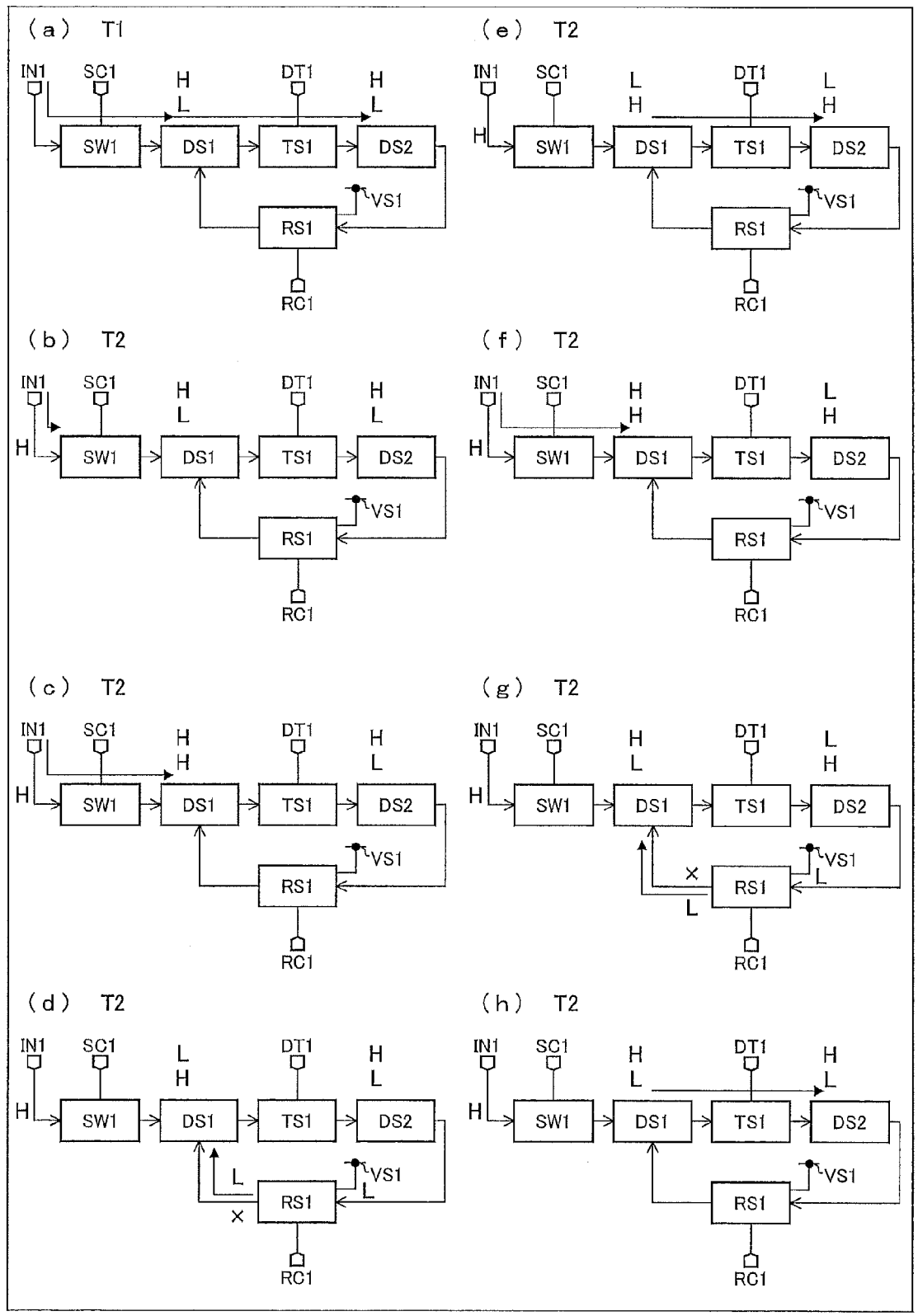
FIG. 3

The following describes a transition of states of the pixel memory MR, with reference to (a) through (h) of FIG. 3. In the embodiment, the first potential level is High and is shown as "H" in the drawing, and the second potential level is Low and is shown as "L" in the drawing. Moreover, at parts where "H" and "L" are written in a line on top of each other, the upper one indicates the transition state of the potential level in a case where "H" is to be written into the pixel memory MR, and the lower one indicates a transition state of the potential level in a case where "L" is to be written into the pixel memory MR.

In a write-in mode of data, first, a write-in period T1 of data is provided.

As illustrated in (a) of FIG. 3, the write-in period T1 has the switch circuit SW1 in the ON state by the switch circuit SW1 being effected by the switch control line SC1, and has a binary logic level, expressed by either the first potential level or the second potential level corresponding to the data, be inputted into the first data storage section DS1 from the data input line IN1 via the switch circuit SW1.

After the binary logic level is inputted into the first data storage section DS1, the switch circuit SW1 switches to the OFF state by the switch circuit SW1 being effected by the switch control line SC1. Moreover, at this time, the data transfer section TS1 is made in the ON state by being effected by the data transfer control line DT1, which ON state allows for the transfer operation. The binary logic level is transferred to the second data storage section DS2 from the first data storage section DS1 via the data transfer section TS1 while the binary logic level inputted into the first data storage section DS1 is kept stored in the first data storage section DS1. After the binary logic level is transferred to the second data storage section DS2, the data transfer section TS1 switches to the OFF state, that is, a state in which no transfer operation is carried out.

Moreover, subsequent to the write-in period T1, a refresh period T2 (data holding period) is provided.

As illustrated in (b) of FIG. 3, the refresh period T2 first outputs the first potential level from the demultiplexer 15 to the data input line IN1.

Thereafter, as illustrated in (c) of FIG. 3, the switch circuit SW1 is switched to the ON state by being effected by the switch control line SC1, and the first potential level is inputted from the data input line IN1 to the first data storage section DS1 via the switch circuit SW1. After the first potential level is inputted into the first data storage section DS1, the switch circuit SW1 switches to the OFF state by being effected by the switch control line SC1.

Next, as illustrated in (d) of FIG. 3, the refresh output control section RS1 is controlled by the refresh output control line RC1 to be in a state in which the first operation is carried out. The first operation of the refresh output control section RS1 differs depending on control information, which information is indicative of whether the second data storage section DS2 stores the first potential level or the second potential level as the binary logic level.

Namely, in a case in which the second data storage section DS2 stores the first potential level, the refresh output control section RS1 is made into the active state by having first control information be transmitted from the second data storage section DS2 to the refresh output control section RS1, which first control information indicates that the second data storage section DS2 stores the first potential level, and thereafter the refresh output control section RS1 takes in an input into the refresh output control section RS1 and supplies this to the first data storage section DS1 as an output of the refresh output control section RS1. When the refresh output control section RS1 carries out the first operation, the potential of the supply source VS1 is set so that it is possible to supply the second potential level to the input of the refresh output control section RS1 at least finally, during a period in which the first control information is transmitted to the refresh output control section RS1. In this case, the first data storage section DS1 stores the second potential level supplied from the refresh output control section RS1 in such a manner that the second potential level is written over the binary logic level stored until then.

On the other hand, in the case where the second potential level is stored in the second data storage section DS2, the refresh output control section RS1 is in the inactive state; by having second control information be transmitted from the second data storage section DS2 to the refresh output control section RS1, which second control information indicates that the second data storage section DS2 stores the second potential level, the state becomes a state in which output is stopped (shown as "x" in drawing). In this case, the first data storage section DS1 continues to store the first potential level.

Thereafter, the refresh output control section RS1 is controlled to be in a state in which the second operation is carried out, by being effected by the refresh output control line RC1.

Next, as illustrated in (e) of FIG. 3, in the refresh period T2, the data transfer section TS1 is next made into a state for carrying out transfer operation by being effected by the data transfer control line DT1; the binary logic data stored in the first data storage section DS1 is transferred to the second data storage section DS2 from the first data storage section DS1 via the data transfer section TS1, while the binary logic data is kept stored in the first data storage section DS1. After the data is transferred from the first data storage section DS1 to the second data storage section DS2, the data transfer section TS1 is made into the OFF state, that is, made in a state in which no transfer operation is carried out.

Next, as illustrated in (f) of FIG. 3, the switch circuit SW1 is made into the ON state by the switch control line SC1, and the first potential level is inputted into the first data storage section DS1 from the data input line IN1 via the switch circuit SW1. After the first potential level is inputted into the first data storage section DS1, the switch circuit SW1 is switched to the OFF state by being effected by the switch control line SC1.

Next, as illustrated in (g) of FIG. 3, the refresh output control section RS1 is controlled to a state which carries out the first operation, by being effected by the refresh output control line RC1. In the case where the first potential level is stored in the second data storage section DS2, the refresh output control section RS1 becomes in an active state and carries out an operation of supplying a second potential level that is supplied from the supply source VS1 to the first data storage section DS1. In this case, the first data storage section DS1 stores the second potential level supplied from the refresh output control section RS1 in a state in which the second potential level is written over the binary logic level stored until then. On the other hand, in a case where the second potential level is stored in the second data storage section DS, the refresh output control section RS1 is in the inactive state, and becomes a state in which the output is stopped. In this case, the first data storage section DS1 continues to store the first potential level stored until then. Thereafter, the refresh output control section RS1 is controlled to be in a state for carrying out the second operation by being controlled by the refresh output control line RC1, and is made in the state in which no output is made.

Subsequently, as illustrated in (h) of FIG. 3, the data transfer section TS1 is made into a state in which a transfer operation is carried out by the data transfer control line DT1, and the binary logic level stored in the first data storage section DS1 until then is transferred to the second data storage section DS2 from the first data storage section DS1 via the data transfer section TS1, while the binary logic level is still kept stored in the first data storage section DS1. After the binary logic level is transferred from the first data storage section DS1 to the second data storage section DS2, the data transfer section TS1 becomes in the OFF state, i.e. in the non-transfer operation state.

By the foregoing series of operations, the binary logic level written into the write-in period T1 in (a) of FIG. 3 is reconstituted in the first data storage section DS1 and the second data storage section DS2, in (h) of FIG. 3. Hence, even if the operations from (b) through (h) of FIG. 3 are repeated any number of times after (h) of FIG. 3, the data written into the write-in period T1 is similarly reconstituted.

Here, in a case where the first potential level (High in this case) is written into the write-in period T1, the first potential level is reconstituted to the first potential level by being inverted in level once each in (d) of FIG. 3 and (f) of FIG. 3 and thereafter being refreshed; in a case where the second potential level (Low in this case) is written into the write-in period T1, the second potential level is reconstituted to the second potential level by being inverted once each in (c) of FIG. 3 and (g) of FIG. 3 and thereafter being refreshed.

If the first potential level is to be Low and the second potential level is to be High, the foregoing operation principle is to be reversed.

According to the configuration, in the refresh period T2, the first potential level is supplied from the data input line IN1 to the first data storage section DS1 as illustrated in (c) and (f) of FIG. 3, and the refresh output control section RS1 makes the second potential level be supplied from the supply source VS1 to the first data storage section DS1, as in (d) and (g) of FIG. 3. Hence, there is no need to have an inverter for carrying out the refresh operation.

Therefore, even if an off state leakage current occurs with a data transfer element used in the data transfer section TS1 and the potential of the data storage node of the second data storage section DS2 varies, it is possible to have the refresh output control section RS1, which is a circuit that carries out a refresh operation based on a potential of the data storage node, to appropriately carry out an operation without an increase in the consumed amount of current and without any malfunction.

Next describes a specific configuration and operation of the pixel memory MR.

Figure 4:
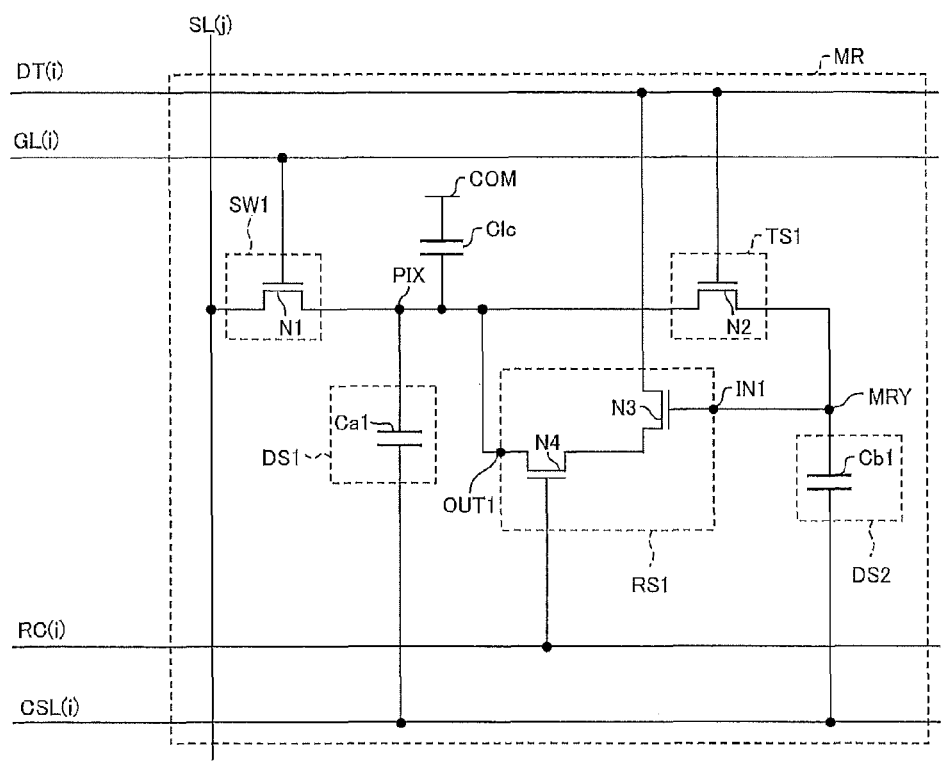
FIG. 4

FIG. 4 illustrates a configuration of the pixel memory MR (memory circuit) according to the present embodiment, as an equivalent circuit.

The pixel memory MR includes, as described above, a switch circuit SW1, a first data storage section DS1, a data transfer section TS1, a second data storage section DS2, and a refresh output control section RS1.

The switch circuit SW1 includes a transistor N1 (first transistor), which is an N-channel TFT. The first data storage section DS1 includes a capacitor Ca1 (first storage capacitor). The data transfer section TS1 includes a transistor N2 (second transistor), which is an N-channel TFT serving as a transfer element. The second data storage section DS2 includes a capacitor Cb1 (second storage capacitor). The refresh output control section RS1 includes a transistor N3 (fourth transistor), which is an N-channel TFT, and a transistor N4 (third transistor), which is an N-channel TFT. The capacitor Ca1 has a capacitance greater than that of the capacitor Cb1.

Namely, in FIG. 4, all transistors which make up the pixel memory MR are N-channel TFTs (field effect transistor). Hence, the pixel memory MR can be made easily inside amorphous silicon.

Moreover, as signal lines for driving the pixel memories MR, the liquid crystal display device 1 includes the gate lines GL(i), the data transfer control lines DT(i), the refresh output control lines RC(i), the source lines SL(j), and the CS lines CSL(i).

One of drain/source terminals (conductive terminal) of a field-effect transistor as like the TFT is called a first drain/source terminal, and the other one of the drain/source terminals is called a second drain/source terminal. The same applies for other examples herein.

A gate terminal (control terminal) of the transistor N1 is connected to a corresponding one of the gate lines GL(i), a first drain/source terminal of the transistor N1 is connected to a corresponding one of the source lines SL(j), and a second drain/source terminal of the transistor N1 is connected to a node PIX (storage node) which is one end of the capacitor Ca1. The other end of the capacitor Ca1 is connected to a corresponding one of the CS lines CSL(i). When the transistor N1 is in the ON state, the switch circuit SW1 is in a conductive state, and when the transistor N1 is in the OFF state, the switch circuit SW1 is in a disconnected state.

A gate terminal of the transistor N2 is connected to a corresponding one of the data transfer control line DT(i), a first drain/source terminal of the transistor N2 is connected to the node PIX, and a second drain/source terminal of the transistor N2 is connected to a node MRY (storage node) which is one end of the capacitor Cb1. The other end of the capacitor Cb1 is connected to the CS line CSL(i). When the transistor N2 is in the ON state, the data transfer section TS1 is in a state in which the transfer operation is carried out, and when the transistor N2 is in the OFF state, the data transfer section TS1 is in a state in which no transfer operation is carried out.

A gate terminal of the transistor N3 is connected to the node MRY as an input terminal IN1 of the refresh output control section RS1, a first drain/source terminal of the transistor N3 is connected to the data transfer control line DT(i), and a second drain/source terminal of the transistor N3 is connected to a first drain/source terminal of the transistor N4. A gate terminal of the transistor N4 is connected to the refresh output control line RC(i), and the second drain/source terminal of the transistor N4 is connected to the node PIX as an output terminal OUT1 of the refresh output control section RS1. Namely, the transistor N3 and the transistor N4 are connected in series, disposed between the input of the refresh output control section RS1 and the output of the refresh output control section RS1 in such a manner that the transistor N3 is disposed on a side closer to the input of the refresh output control section RS1. The connected position of the transistor N3 and the transistor N4 may be the other way round of the example above, as long as the transistor N3 and the transistor N4 are connected in series between the input of the refresh output control section RS1 and the output of the refresh output control section RS1.

When the transistor N4 is in the ON state, the refresh output control section RS1 is controlled in a state in which the first operation is carried out, and when the transistor N4 is in the OFF state, the refresh output control section RS1 is controlled in a state in which a second operation is carried out. The transistor N3 is of an N-channel; when the refresh output control section RS1 carries out the first operation, the control information in the active state, i.e. the active level, is High, and the control information in an inactive state, i.e. the inactive level, is Low.

Note that a liquid crystal capacitor Clc is connected between the node PIX and the counter electrode (common electrode) COM.

The next description explains the operation of the pixel memory MR of the foregoing configuration. The following description primarily explains basic operations of the pixel memory MR; the change in potential caused by the parasitic capacitor described above will not be taken into consideration.

Figure 5:
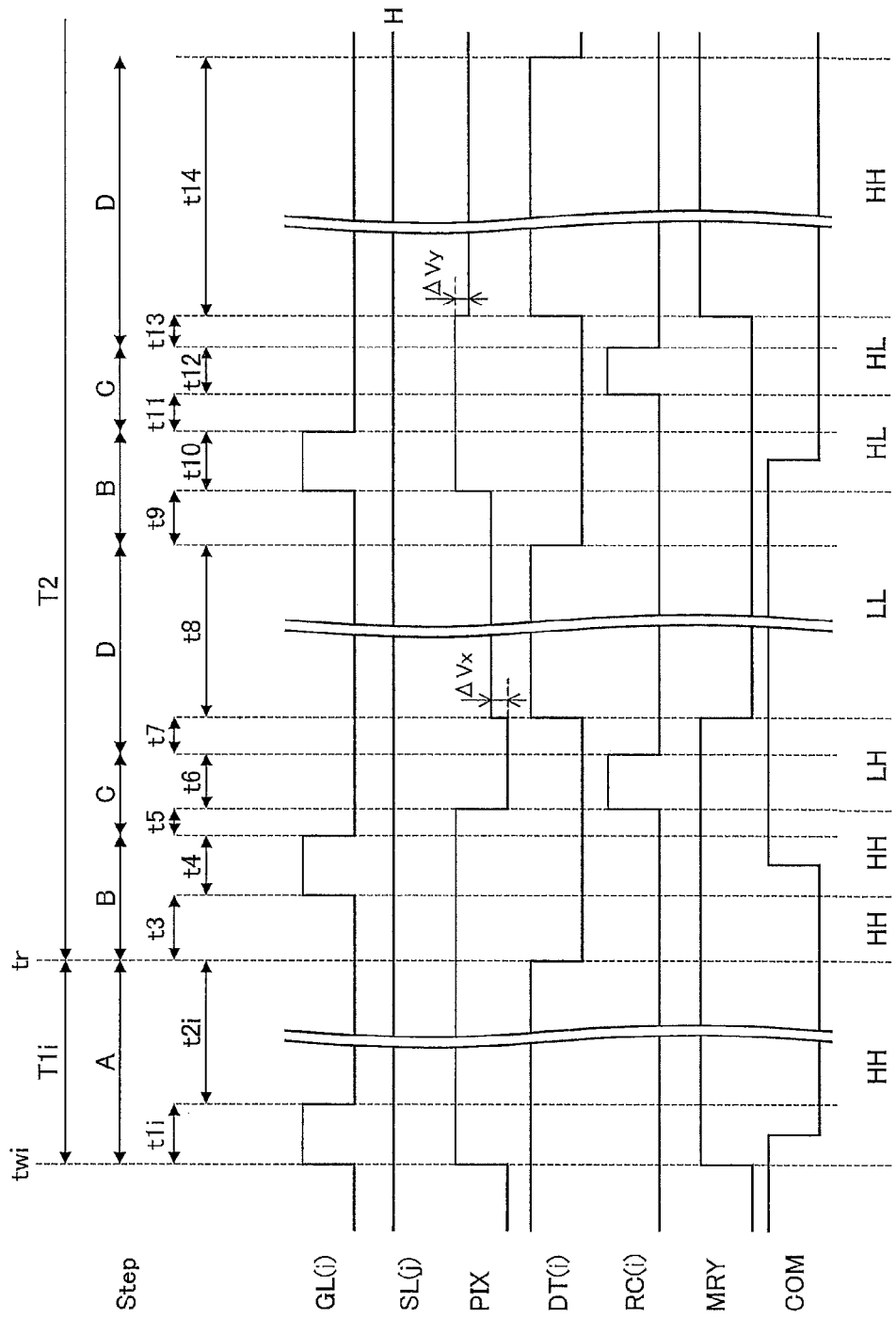
FIG. 5
Figure 6:
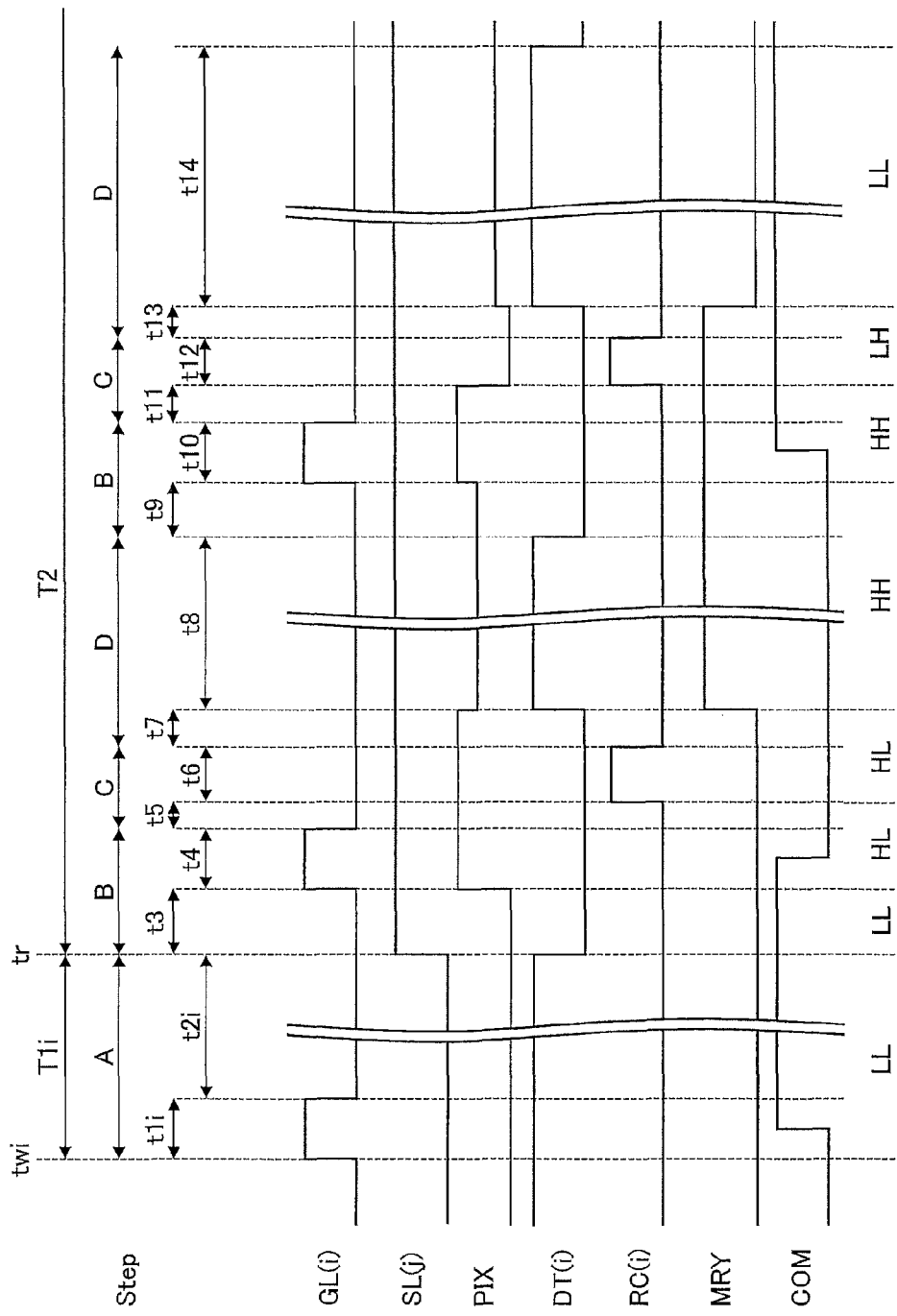
FIG. 6

FIG. 5 and FIG. 6 each illustrate a write-in operation of data into the pixel memory MR. In the present example, rows of the pixel array 6 are driven (scanned) line sequentially. Hence, the write-in period T1 is determined per row, and the write-in period T1 of row i is expressed as T1i. FIG. 5 illustrates a case in which "1"=High is written into the write-in period T1i as first data, and FIG. 6 illustrates a case in which "0"=Low is written into the write-in period T1i as second data. Moreover, FIG. 5 and FIG. 6 each provides, on their lower parts, the potential of the node PIX (left) and the potential of the node MRY (right) for each period corresponding to (a) through (h) of FIG. 3.

In FIG. 5, potentials of binary levels of High (active level) and Low (inactive level) are applied on the gate line GL(i), the data transfer control line DT(i), and the refresh output control line RC(i) from the control signal buffer circuit 13. Alternatively, a High potential and a Low potential of the binary level may be set individually for each line. To the source line SL(j), a binary logic level of High and Low having a lower High potential than the High potential of the gate line GL(i) is outputted from the drive signal generation circuit/video signal generation circuit 14 via the demultiplexer 5. The High potential of the data transfer control line DT(i) is equal to either of the High potential of the source line SL(j) or the High potential of the gate line GL(i), and the Low potential of the data transfer control line DT(i) is equal to the Low potential of the binary logic level. Moreover, a potential (CS potential) supplied by the CS line CSL(i) is fixed.

The write-in operation of data has a write-in period T1i and a refresh period T2. The write-in period T1i starts from a time twi set per row. The refresh period T2 is started at once for all rows from time tr after the writing in of data is completed for all rows of the pixel memories MR. The write-in period T1i is a period to write in data to be held by the pixel memory MR1, and is made up of a period t1i and a period t2i sequentially provided. The refresh period T2 is a period which holds the data written into the pixel memory MR while refreshing the data, and includes period t3 to period t14 sequentially provided.

In the write-in period T1i, potentials of both the gate line GL(i) and the data transfer control line DT(i) are High in the period t1i. The potential of the refresh output control line RC(i) is Low. This causes the transistors N1 and N2 to be in an ON state, which makes the switch circuit SW1 be in a conductive state and the data transfer section TS1 be in a state in which a transfer operation is carried out. Furthermore, a first potential level (High in this case) supplied to the source line SL(j) is written into the node PIX. In the period t2*i*, the potential of the gate line GL(i) becomes Low, whereas the potential of the data transfer control line DT(i) is maintained High. The potential of the refresh output control line RC(i) is Low. This makes the transistor N1 be in the OFF state, which causes the switch circuit SW1 to be in the disconnected state. Moreover, since the transistor N2 maintains its ON state, the data transfer section TS1 maintains its state of carrying out the transfer operation. Therefore, a first potential level is transferred from the node PIX to the node MRY, and the nodes PIX and MRY are disconnected from the source line SL(j). The foregoing process corresponds to the state in (a) of FIG. 3.

Subsequently, the refresh period T2 starts. In the refresh period T2, the potential (Vsig) of the source line SL(j) is High, which is the first potential level. Moreover, with the gate line GL(i), the data transfer control line DT(i), and the refresh output control line RCi, a drive described below is carried out for all those lines which fall under the following range: 1≤i≤n. Namely, a refresh operation is carried out at once to all of the pixel memories MR (hereinafter, may be referred to as "entire refresh operation").

In the refresh period T2, the potential of the gate line GL(i) is Low, the potential of the data transfer control line DT(i) becomes Low, and the potential of the refresh output control line RC(i)i is Low in the period t3. This causes the transistor N2 to be in the OFF state, which makes the data transfer section TS1 be in a state in which no transfer operation is carried out, thereby making the node PIX and the node MRY be disconnected from each other. Both of the node PIX and the node MRY are maintained High. The foregoing process corresponds to the state of (b) in FIG. 3.

In the period t4, the potential of the gate line GL(i) becomes High, the potential of the data transfer control line DT(i) is maintained Low, and the potential of the refresh output control line RC(i) is maintained Low. This makes the transistor N1 be in the ON state, which makes the switch circuit SW1 be in a conductive state, and a High potential is again written into the node PIX from the source line SL(j).

In the period t5, the potential of the gate line GL(i) becomes Low, the potential of the data transfer control line DT(i) is maintained Low, and the potential of the refresh output control line RC(i) is maintained Low. The transistor N1 is thus in the OFF state, which causes the switch circuit SW1 to be in the disconnected state, and the node PIX is disconnected from the source line SL(j) and is maintained High.

The processes of period t4 and period t5 correspond to the state in FIG. 5(*c*).

In the period t6, the potential of the gate line GL(i) is maintained Low, the potential of the data transfer control line DT (i) is maintained Low, and the potential of the refresh output control line RC(i) becomes High. This makes the transistor N4 be in the ON state, and the refresh output control section RS1 carries out the first operation. Moreover, since the potential of the node MRY is High, the transistor N3 is in the ON state; this causes the refresh output control section RS1 to be in an active state, and a Low potential is supplied from the data transfer control line DT(i) to the node PIX, via the transistors N3 and N4. The data transfer control line DT(i) also serves as the supply source VS1 in FIG. 2.

In the period t7, the potential of the gate line GL(i) is maintained Low, the potential of the data transfer control line DT(i) is maintained Low, and the potential of the refresh output control line RC(i) becomes Low. This makes the transistor N4 be in the OFF state, which causes the refresh output control section RS1 to be in a state which carries out a second operation, and the node PIX is disconnected from a second word line Xi(2) and is maintained Low.

The process of period t6 to period t7 corresponds to the state in (d) of FIG. 3.

In the period t8, the potential of the gate line GL(i) is maintained Low, the potential of the data transfer control line DT(i) becomes High, and the potential of the refresh output control line RC(i) is maintained Low. This makes the transistor N2 be in the ON state, and the data transfer section TS1 becomes in the state in which the transfer operation is carried out. At this time, electric charge moves between the capacitor Ca1 and the capacitor Cb1, and the potential of both the node PIX and the node MRY become Low. The potential of the node PIX increases just by a slight voltage ΔVx caused by a positive electric charge moving from the capacitor Cb1 to the capacitor Ca1 via the transistor N2, however this increase is within a range of the Low potential.

The period t8 is a period in which refreshed binary logic data is stored by both the first data storage section DS1 and the second data storage section DS2 which are connected to each other via the data transfer section TS1, and this period t8 may be set long. The same applies for the examples described later.

In the period t9, the potential of the gate line GL(i) is maintained Low, the potential of the data transfer control line DT(i) becomes Low, and the potential of the refresh output control line RC(i) is maintained Low. This makes the transistor N2 be in the OFF state, which causes the data transfer section TS1 to be in a state in which no transfer operation is carried out, and the node PIX and the node MRY are disconnected from each other. The node PIX and the node MRY are both maintained Low. The process of period t8 to period t9 corresponds to the state of (e) of FIG. 3.

In the period t10, the potential of the gate line GL(i) becomes High, the potential of the data transfer control line DT(i) is maintained Low, and the potential of the refresh output control line RC(i) is maintained Low. This makes the transistor N1 be in the ON state, whereby causing the switch circuit SW1 to be in a conductive state, and as a result, a High potential is again written into the node PIX from the source line SL(j).

In the period t11, the potential of the gate line GL(i) becomes Low, the potential of the data transfer control line DT(i) is maintained Low, and the potential of the refresh output control line RC(i) is maintained Low. This makes the transistor N1 be in the OFF state, which causes the switch circuit SW1 to be in the disconnected state. Consequently, the node PIX maintains its High state by being disconnected from the source line SL(j).

The process of period t10 to period t11 corresponds to the state of (f) of FIG. 3.

In period t12, the potential of the gate line GL(i) is maintained Low, the potential of the data transfer control line DT(i) is maintained Low, and the potential of the refresh output control line RC(i) becomes High. This makes the transistor N4 be in the ON state, and the refresh output control section RS1 becomes in a state in which the first operation is carried out. Moreover, since the potential of the node MRY is Low, the transistor N3 is in the OFF state; this makes the refresh output control section RS1 be in the inactive state, which is a state in which output is stopped. As a result, the node PIX maintains its High state.

In the period t13, the potential of the gate line GL(i) is maintained Low, the potential of the data transfer control line DT(i) is maintained Low, and the potential of the refresh output control line RC(i) becomes Low. This makes the transistor N4 be in the OFF state, which causes the refresh output control section RS1 to become in a state in which the second operation is carried out, and the node PIX is maintained as High.

The process of period t12 to period t13 corresponds to the state of (g) of FIG. 3.

In the period t14, the potential of the gate line GL(i) is maintained Low, the potential of the data transfer control line DT(i) is maintained High, and the potential of the refresh output control section RS1 is maintained Low. This makes the transistor N2 be in the ON state, which causes the data transfer section TS1 to be in the state in which the transfer operation is carried out. At this time, an electric charge moves between the capacitor Ca1 and the capacitor Cb1, thereby causing the potentials of both the node PIX and the node MRY to become High. Although the potential of the node PIX decreases just by a slight voltage $\Delta Vy$ due to the movement of a positive electric charge from the capacitor Ca1 to the capacitor Cb1 via the transistor N2, the decreased potential is still within a range of the High potential. The foregoing process corresponds to the state in (h) of FIG. 3.

The period t14 is a period in which refreshed binary logic data is stored by both the first data storage section DS1 and the second data storage section DS2 that are connected to each other via the data transfer section TS1, and this period can be set long. The same applies for Examples described later.

As a result of the foregoing operations, the node PIX is High from the period t1$i$ to period t5 and from the period t10 to period t14, and is Low from the period t6 to period t9, and the potential of the node MRY is High from the period t1$i$ to period t7 and in the period t14, and is Low from the period t8 to period t13.

In a case where the refresh period T2 is continued thereafter, the operations of period t3 to period t14 are repeated. In a case in which new data is written in, the refresh period T2 is terminated and the entire refresh operation mode is released.

The above description explains FIG. 5.

An order to carry out the entire refresh operation can be generated not by an external signal but by a clock generated inside, for example with an oscillator or the like. This eliminates the need to have an external system input a refresh order every fixed time, and is advantageous in that a flexible system configuration is attainable. In a dynamic memory circuit using the pixel memories MR according to the present embodiment, the entire refresh operation is not necessarily carried out by scanning per gate line GL(i), and can be carried out collectively for the entire array. Hence, it is possible to eliminate a peripheral circuit required with a common conventional dynamic memory circuit to refresh while carrying out destructive read of the potential of the source line SL(j).

The following description explains FIG. 6.

In FIG. 6, Low is written into the pixel memory MR as the second potential level in the write-in period T1$i$. However, other than that the potential of the source line SL(j) in the write-in period T1$i$ is Low, the change in the potentials of the gate line GL(i), the data transfer control line DT(i), and the refresh output control line RC(i) in each of the periods, are identical to that of FIG. 5.

Hence, the potential of node PIX is Low from the period t1$i$ to period t3 and from the period t12 to period t14, and is High from the period t4 to period t11, and the potential of the node MRY is Low from the period t1$i$ to period t7 and in the period t14, and is High from the period t8 to period t13.

Illustrated in (a) through (h) of FIG. 3 are transitions of the states of the pixel memory MR. The operation steps of the pixel memory MR in FIG. 5 and FIG. 6 can be divided as described below.

(1) First Step (Period T1$i$ to Period T2$i$ (Write-in Period T1$i$))

In the first step, a binary logic level is written into the pixel memory MR by having the switch circuit SW1 conduct electricity in a state in which (a) the binary logic level corresponding to the data is supplied to the source line SL(j) from the drive signal generation circuit/video signal generation circuit 4 and (b) the second operation has been carried out by the refresh output control section RS1, and a transfer operation is carried out by the data transfer section TS1 in a state in which (a) the binary logic level is written in the pixel memory MR and (b) the second operation has been carried out by the refresh output control section RS1.

(2) Second Step (Each of Period T3 to Period T4 and Period t9 to Period t10)

Following the first step, the second step conducts electricity through the switch circuit SW1 in a state in which (a) the second operation has been carried out by the refresh output control section RS1 and (b) a non-transfer operation has been carried out by the data transfer section TS1, to input to the first data storage section DS1 via the source line SL(j), a binary logic level of a level corresponding to control information that causes the refresh output control section RS1 to be in an active state.

(3) Third Step (Each of Period T5 to Period T6 and of Period t11 to Period t12)

Following the second step, the third step carries out the first operation by the refresh output control section RS1 in a state in which (a) the switch circuit SW1 is disconnected and (b) the non-transfer operation has been carried out by the data transfer section TS1, and at a time of terminating the first operation, the state is to be in a state in which a binary logic level is inputted to the refresh output control section RS1 from the supply source VS1, which binary logic level is that of an inverted level of a level that corresponds to control information that causes the refresh output control section RS1 to be in an active state.

(4) Fourth Step (Each of Period T7 to Period T8, and Period t13 to Period t14)

Following the third step, the fourth step carries out a transfer operation by the data transfer section TS1, in a state in which (a) the switch circuit SW1 is disconnected and (b) the second operation has been carried out by the refresh output control section RS1.

As the entire write-in operation, the first step is first carried out, and following the first step, the series of operations (period t3 to period t8) from the start of the second step to the end of the fourth step are carried out at least once.

The liquid crystal capacitor Clc illustrated in FIG. 4 is a capacitor in which a liquid crystal layer is disposed between the node PIX and the common electrode COM. Namely, the node PIX is connected to the pixel electrode. At this time, the capacitor Ca1 also functions as a storage capacitor of the pixel 40. Moreover, the transistor N1 which makes up the switch circuit SW1 also functions as a selection element of the pixel 40. The common electrode (counter electrode) COM is provided on a common electrode substrate that faces the active matrix substrate on which the circuit of FIG. 4 is formed. However, the common electrode COM may be provided on the same substrate as the active matrix substrate.

In the multiple tone display mode (regular operation mode), display is carried out by the pixel memory MR by supplying to the pixel 40 a data signal that has a greater number of potential levels than the binary level and in a state in which no first operation is carried out, which first operation causes the refresh control section RS1 to be in the active state.

In the multiple tone display mode, just the capacitor Ca1 can be functioned as a storage capacitor by fixing the potential of the data transfer control line DT(i) as Low, or the capacitor Ca1 and capacitor Cb1 together can be functioned as a storage capacitor by fixing the potential of the data transfer control line DT(i) as High. Moreover, by fixing the potential of the refresh output control line RC(i) as Low and maintaining the transistor N4 as in the OFF state, or alternatively, by setting the potential of the data transfer control line DT(i) high so that the transistor N3 is in the OFF state, the potential of the data transfer control line DT(i) can be made so that it does not affect a display tone of the liquid crystal capacitor Clc, which display tone is determined by an electric charge stored in the first data storage section DS1, and can achieve a display performance the same as a liquid crystal display device that does not have the memory function.

On the other hand, in the memory operation mode, it is possible to carry out display in accordance with a potential of the first data storage section. In a case where a polarity of liquid crystal fails to be inverted in pace in an AC driving manner, image sticking occurs and moreover the liquid crystal deteriorates. Hence, in whichever case in which the liquid crystal is on (white display) or the liquid crystal is off (black display), it is necessary to invert the polarity while maintaining a same absolute value of a voltage to be applied to the liquid crystal. Accordingly, the potential Vcom of the counter electrode COM is set so that the potential difference between the pixel potential and the counter potential Vcom in the positive drive is equal to the potential difference between the pixel potential and the counter potential Vcom in the negative drive (optimum counter potential).

In FIG. 5 and FIG. 6, the potential of the common electrode COM is driven so as to be inverted between High and Low every time the transistor N1 switches to the ON state. If the High potential of the common electrode COM is equal to the High potential of the binary logic level, and the Low potential of the common electrode COM is equal to the Low potential of the binary logic level, a black display of a positive polarity is achieved when the potential of the node PIX is Low and a white display of a positive polarity is achieved when the potential of the node PIX is High, each while the potential of the common electrode COM is Low, and while the potential of the common electrode COM is High, a white display of a negative polarity is achieved when the potential of the node PIX is Low and a black display of a negative polarity is achieved when the potential of the node PIX is High. As a result, the liquid crystal is driven so that a direction of a voltage applied to a liquid crystal is inverted every time the potential of the node PIX is refreshed, while the liquid crystal maintains its display tone for the most part. This allows for carrying out AC drive of the liquid crystal in which positive and negative effective values of a voltage applied on the liquid crystal become fixed. Moreover, the potential (two values) of the common electrode COM may be configured to be larger than a minimum value of the data signal potential and be smaller than a maximum value of the data signal potential. Moreover, the potential of the common electrode COM may be set to a fixed value as shown in Examples 1 and 2 described later.

Figure 18:
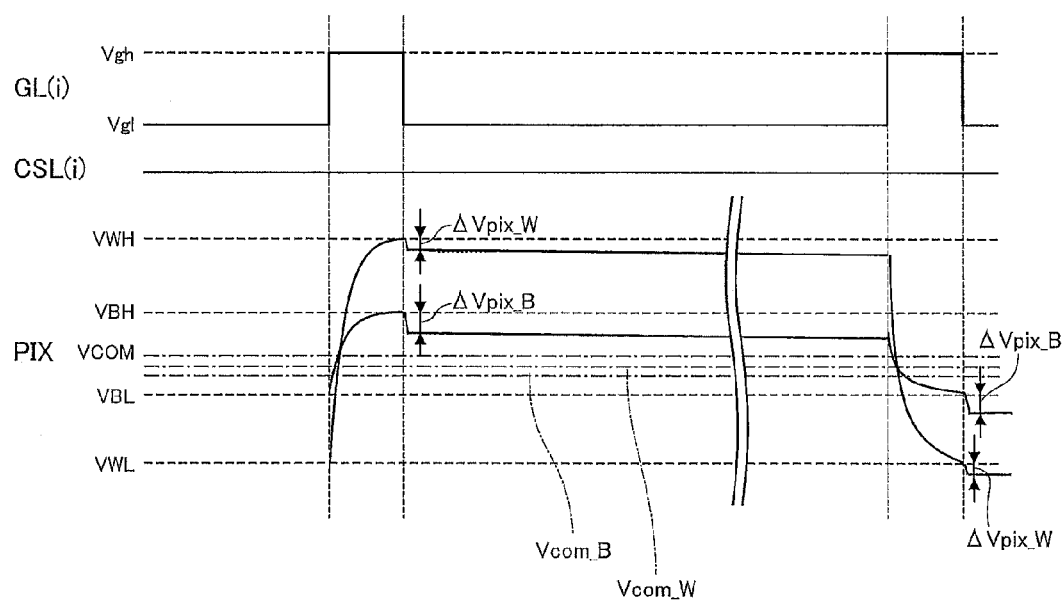
FIG. 18

However, as illustrated in FIG. 18, the liquid crystal display device has the problem that flicker occurs in a predetermined tone, due to the disagreement of the optimum counter potentials (Vcom_W, Vcom_B) between the case in which a potential corresponding to a white display is written in and the case in which the potential corresponding to a black display is written in.

Figure 7:
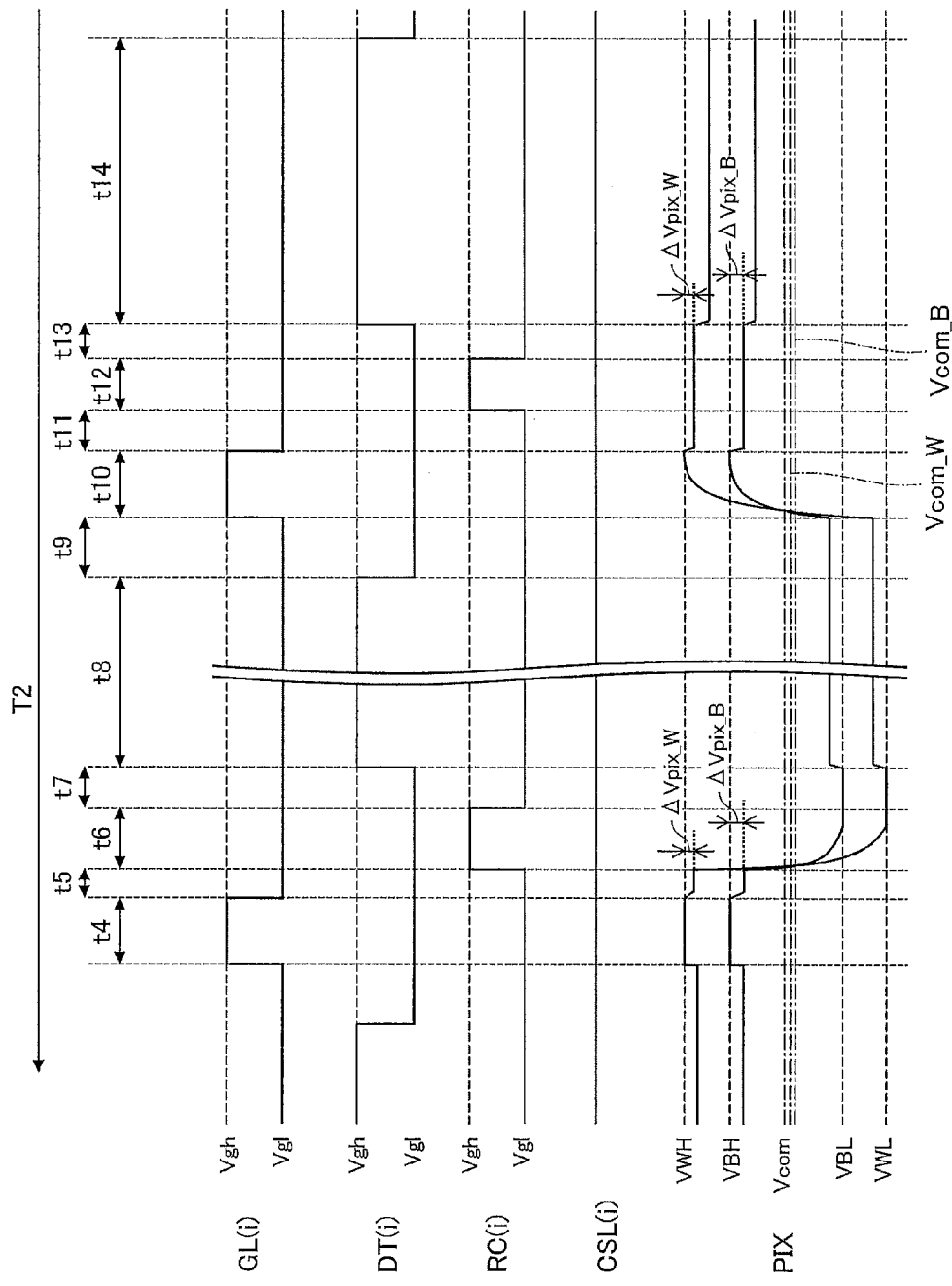
FIG. 7

Since in FIG. 5 and FIG. 6 the parasitic capacitor Cgd of the transistor N1 is not taken into consideration, the pixel potential (potential of node PIX) does not vary even if the transistor N1 is switched off and hence shows an ideal waveform. However, practically, the pixel potential varies due to the parasitic capacitor Cgd. As a result, the optimum counter potential Vcom shifts, as illustrated in FIG. 18. FIG. 7 illustrates a case where there is a difference between the optimum counter potentials Vcom in the pixel memory MR of FIG. 4. FIG. 7 specifically illustrates the changes in potentials of the gate line GL(i), the data transfer section DT(i), the refresh output control line RC(i), the CS line CSL(i), and the node PIX, in the refresh period T2 in FIG. 5. As illustrated in FIG. 7, when the gate line GL(i) changes from the High potential to the Low potential (when the transistor N1 switches OFF), the optimum counter potential Vcom shifts from the center potential caused by the decrease in the potential of the node PIX by being effected by the parasitic capacitor Cgd of the transistor N1. Moreover, the optimum counter potential (Vcom_W) in the case in which a potential corresponding to a white display is written in disagrees with the optimum counter potential (Vcom_B) in the case in which the potential corresponding to a black display is written in. This causes the problem that the flicker occurs, thereby causing deterioration of the display quality.

Accordingly, in addition to the foregoing configuration, the present liquid crystal display device includes a configuration in which the optimum counter potentials Vcom (VcomW, VcomB) is set by adjusting the potential (CS potential) to be supplied to the CS line CSL(i). The following description explains this configuration, with reference to Examples 1 to 3.

EXAMPLE 1

Figure 8:
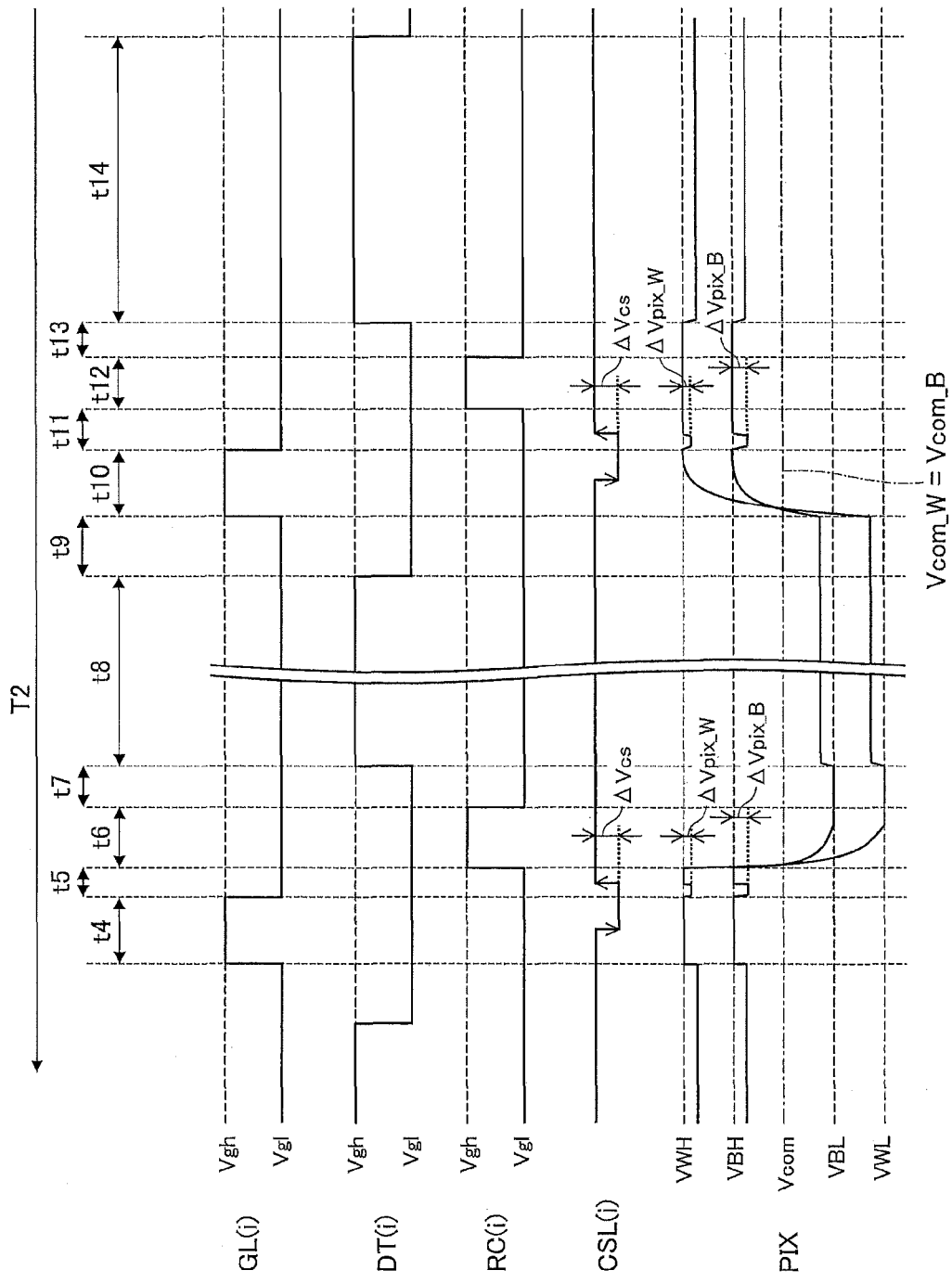
FIG. 8
Figure 16:
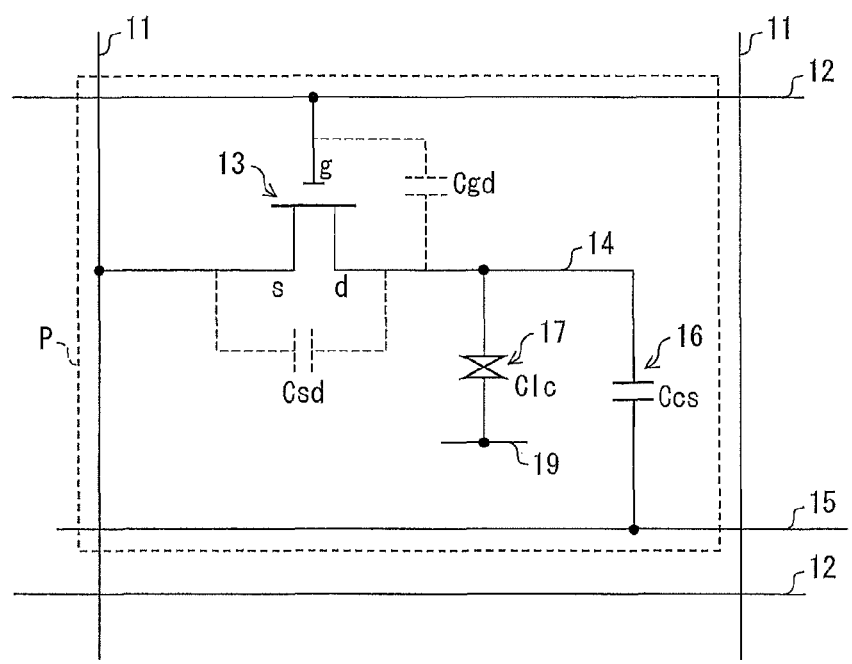
FIG. 16
Figure 17:
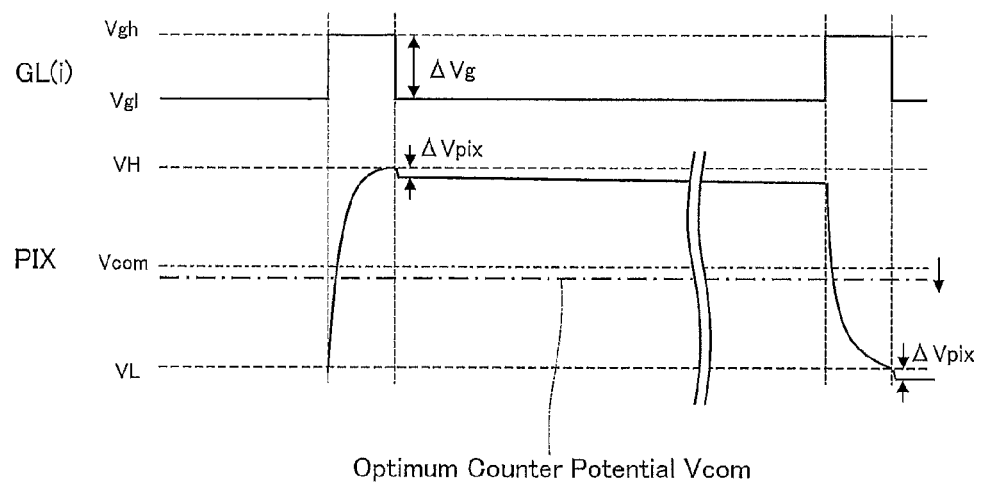
FIG. 17

FIG. 8 is a timing chart illustrating an operation corresponding to a pixel (FIG. 4) of the present liquid crystal display device. In the description below, for easy explanation, FIG. 9 is used as an example for describing the operations in a case in which the idea of the present invention is applied to a pixel of FIG. 16 to compare with the conventional operations illustrated in FIG. 18; descriptions of the operations illustrated in FIG. 8 are described later.

Figure 9:
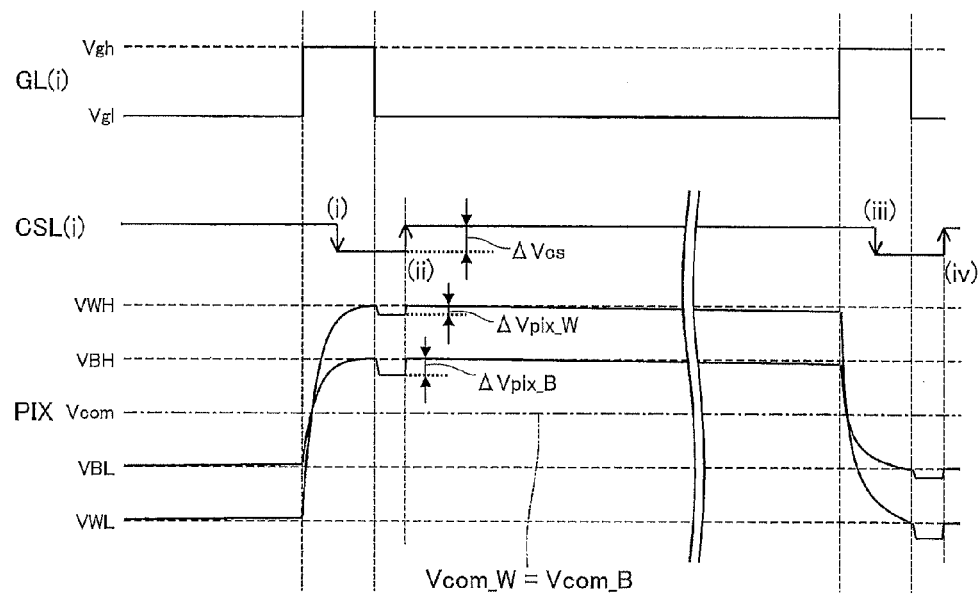
FIG. 9

FIG. 9 is a timing chart illustrating how the potential (pixel potential) of the pixel electrode 14 (see FIG. 16) varies when the idea of the present invention is applied to the operation of FIG. 18. FIG. 9 illustrates a state of operations in which the TFT 13 (FIG. 16) is switched on to supply a data signal potential from the source line 11 to the pixel electrode 14, the TFT 13 is switched off after the data signal potential is supplied, and the supplied data signal potential is held until the TFT 13 is switched on the next time.

As illustrated in FIG. 9, a potential (CS potential) of the CS line CSL(i) (CS line 15) is lowered by ΔVcs while the potential of the gate line GL(i) (gate line 12) is in its High period ((i) of FIG. 9). At this time, the transistor 13 is in the ON state, and thus the pixel electrode 14 is connected to the source line 11 via the transistor 13. As a result, even if the CS potential decreases (by ΔVcs), the potential (potential written into the pixel electrode, also referred to as "pixel potential") (High potential) of the pixel electrode 14 does not vary.

Subsequently, when the potential of the gate line 12 is Low, the transistor 13 switches OFF, and the pixel electrode 14 becomes in a floating state; caused by the parasitic capacitor Cgd between the gate electrode g and the drain electrode d of the transistor 13, the pixel potential decreases by ΔVpix (feed-through voltage). Thereafter, the CS potential is increased by ΔVcs, and is made back to the original potential ((ii) of FIG. 9). In this case, the transistor 13 is in the OFF state, and the pixel electrode 14 is in the floating state while keeping the electric charge; by increasing the CS potential by ΔVcs, the pixel potential rises.

The direction that the pixel potential illustrated in (ii) of FIG. 9 rises is opposite of a feed-through varying direction. Hence, the feed-through voltage is corrected to the voltage that originally should be charged.

A variable voltage (feed-through voltage) ΔVpix of the pixel potential and a voltage (correction voltage) ΔVpix' that is corrected by adjusting (decreasing or increasing) the CS potential are represented by the following equations, respectively. Note that Vgh is the gate on-state voltage, Vgl is the gate off-state voltage, and ΔVg is a difference therebetween.

$$\Delta V pix = Cgd \times \Delta Vg/(Clc+Ccs+Cgd+Csd) \quad (4)$$

$$\Delta V pix' = \Delta Vcs \times Ccs/(Clc+Ccs+Cgd+Csd) \quad (5)$$

For example, if assuming, as an ideal state, of a case in which the feed-through voltage (ΔVpix) is completely corrected, the following equation would be accomplished:

$$\Delta V pix = \Delta V pix' \quad (6)$$

Hence, based on the formulae (4) to (6), an adjusting voltage ΔVcs of the CS potential is represented by the following equation:

$$\Delta Vcs = \Delta Vg \times Cgd/Ccs \quad (7)$$

As seen from the equation (7), the liquid crystal capacitor Clc, which varies depending on the on/off of the liquid crystal, is eliminated. Hence, by setting the adjusting voltage (ΔVcs) of the CS potential set for correcting the feed-through voltage (ΔVpix) to a predetermined value with reference to the equation (7), it is possible to satisfy an ideal condition of the equation (6) regardless of the on/off of the liquid crystal. Namely, the decreased pixel potential (feed-through voltage ΔVpix) can be corrected; this allows for making the optimum counter potentials Vcom (VcomW, VcomB) agree between when the liquid crystal is on and when the liquid crystal is off, without adjusting the counter potential Vcom. As a result, it is possible to hold down the occurrence of flicker.

A specific example is described below. In the case in which the liquid crystal capacitor Clc_on is 100 (fF), the liquid crystal capacitor Clc_off is 50 (fF), the storage capacitor Ccs is 200 (fF), the gate-drain parasitic capacitor Cgd is 10 (fF), the source-drain parasitic capacitor Csd is 10 (fF), and the (Vgh−Vgl) is 15 (V), the adjusting voltage ΔVcs of the CS potential is, based on the equation (7), ΔVcs=0.75 V.

The feed-through voltages ΔVpix_on of the white display and ΔVpix_off of the black display, each effected by the parasitic capacitor Cgd of the transistor N1 are, based on the equations (2) and (3), ΔVpix_on=0.469 V and ΔVpix_off=0.55.6 V, respectively.

On the other hand, the correction voltages ΔVpix'_on of the white display and ΔVpix'_off of the black display are, based on the equation (5), ΔVpix'_on=0.469 V and ΔVpix'_off=0.556 V, respectively.

As described above, even if there is a change in the pixel potential (feed-through voltage), correction can be carried out in accordance with the change. Namely, by setting the adjusting voltage (fall/rise voltage) ΔVcs of the CS potential as 0.75 V, it is possible to correct (make back to the original) the decreased amount of the pixel potential (feed-through voltage ΔVpix_on=0.469 V, ΔVpix_off=0.556 V). As a result, there is no need to adjust the counter potential Vcom, and the optimum counter potential VcomW while the liquid crystal is on can be agreed with the optimum counter potential VcomB while the liquid crystal is off. Of course, correction in accordance with this is possible with halftone. Consequently, the flicker can be reduced, thereby improving display quality.

Described below is an operation corresponding to a pixel (FIG. 4) of the present liquid crystal display device, with reference to FIG. 8.

FIG. 8 specifically illustrates the potential changes of the gate line GL(i), the data transfer section DT(i), the refresh output control line RC(i), the CS line CSL(i), and the node PIX, in the refresh period T2 of FIG. 6.

First, in period t4, the potential of the gate line GL(i) becomes High, the potential of the data transfer control line DT(i) is maintained Low, and the potential of the refresh output control line RC(i) is maintained Low. This makes the transistor N1 be in an ON state, thereby making the switch circuit SW1 be in a conductive state. As a result, a High potential (VHW) corresponding to a white display is written into the node PIX from the source line SL(j). While the transistor N1 is in the ON state, the potential of the CS line CSL(i) decreases by ΔVcs ((i) of FIG. 8).

In period t5, the potential of the gate line GL(i) becomes Low, the potential of the data transfer control line DT(i) is maintained Low, and the potential of the refresh output control line RC(i) is maintained Low. This makes the transistor N1 be in an OFF state, which makes the switch circuit SW1 be in a disconnected state. As a result, the node PIX is disconnected from the source line SL(j) and becomes in a floating state. The potential of the node PIX decreases from VWH by ΔVpix_W in an instant the transistor N1 switches OFF, caused by the gate-drain parasitic capacitor Cgd. Thereafter, the potential of the CS line CSL(i) increases by ΔVcs ((ii) of FIG. 8). Accordingly, the potential of the node PIX rises and is made back to the original potential VWH.

In period t6, the potential of the gate line GL(i) is maintained Low, the potential of the data transfer control line DT(i) is maintained Low, and the potential of the refresh output control line RC(i) becomes High. This makes the transistor N4 be in the ON state, and the refresh output control section RS1 carries out the first operation. Moreover, since the potential of the node MRY is High, the transistor N3 is in the ON state. Accordingly, the refresh output control section RS1 is in an active state, and a Low potential (VWL) is supplied to the node PIX from the data transfer control line DT(i) via the transistors N3 and N4.

Similar operations to FIG. 6 are carried out in period t7 to period t9.

In period t10, the potential of the gate line GL(i) becomes High, the potential of the data transfer control line DT(i) is maintained Low, and the potential of the refresh output control line RC(i) is maintained Low. This makes the transistor N1 be in the ON state, which makes the switch circuit SW1 be in a conductive state. As a result, a High potential is again written into the node PIX from the source line SL(j). Moreover, the potential of the CS line CSL(i) decreases by ΔVcs ((iii) of FIG. 8).

In period t11, the potential of the gate line GL(i) becomes Low, the potential of the data transfer control line DT(i) is maintained Low, and the potential of the refresh output control line RC(i) is maintained Low. This makes the transistor N1 be in the OFF state, which makes the switch circuit SW1 be in the disconnected state. As a result, the node PIX is disconnected from the source line SL(j) and becomes in the floating state. The potential of the node PIX decreases from VWH by $\Delta$Vpix_W in an instant the transistor N1 is switched OFF, caused by the gate-drain parasitic capacitor Cgd. Thereafter, the potential of the CS line CSL(i) increases by $\Delta$Vcs ((iv) of FIG. 8). Consequently, the potential of the node PIX increases and is made back to the original potential VWH.

In period t12, the potential of the gate line GL(i) is maintained Low, the potential of the data transfer control line DT(i) is maintained Low, and the potential of the refresh output control line RC(i) becomes High. This makes the transistor N4 be in the ON state, and the refresh output control section RS1 becomes a state in which the first operation is carried out. Moreover, since the potential of the node MRY is Low, the transistor N3 is in the OFF state. This as a result makes the refresh output control section RS1 be in the inactive state, which is a state in which the output is stopped. Accordingly, the node PIX is maintained as High (VWH).

Operations similar to FIG. 6 are carried out in period t13 to period t14.

In a case in which the High potential (VHB) corresponding to the black display is written into the node PIX from the source line SL(j), the potential of the node PIX decreases from VWB by $\Delta$Vpix_B in an instant the transistor N1 is switched OFF (periods t5, t11), caused by the gate-drain parasitic capacitor Cgd. Since the feed-through voltage changes depending on the liquid crystal capacitor based on the equations (2) and (3), the following relationship is satisfied:

$$\Delta \text{Vpix}\_W < \Delta V_{pix}\_B.$$

In this case also, the potential of the CS line CSL(i) that is decreased during the period in which the potential of the gate line GL(i) becomes High is increased by $\Delta$Vcs ((ii), (iv) of FIG. 8). This causes the potential of the node PIX to increase and be made back to the original potential VWB (period t5, period t11).

As described above, the liquid crystal display device according to the present Example 1 has a configuration in which, in a period (T2: data holding period) in which a refresh operation is carried out while image data written into a pixel is held therein and a polarity of the image data is inverted, a CS line CSL(i) is decreased in potential by a predetermined potential while the gate line GL(i) is active (period t4, period t10), and the potential of the CS line CSL(i) is made back to its original potential (increased by the predetermined potential) between when the gate line GL(i) is made inactive to until the refresh output control line RC(i) is made active (period t5, period t11). This allows for having the potential (pixel potential) of the node PIX that is decreased due to the parasitic capacitor Cgd be made back to its original potential, whereby making it possible to set an optimum counter potential (center potential) without adjusting the counter potential Vcom. Moreover, regardless of the value of the data signal potential to be supplied to the source line SL(j), it is possible to set a common optimum counter potential. This allows for reducing the flicker, thereby improving the display quality.

EXAMPLE 2

Example 1 described above focuses only on a potential change (feed-through voltage) caused by the gate-drain parasitic capacitor Cgd of the transistor N1 when the transistor N1 is switched OFF. Next described is a configuration for reducing the flicker in a case in which the pixel potential changes caused by a plurality of causes (Example 2).

A possible cause for the change in pixel potential after the transistor N1 is switched OFF, other than the feed-through voltage caused by the gate-drain parasitic capacitor Cgd of the transistor N1, may be a feed-through voltage caused by a potential change in the source line SL(j).

The following description briefly explains a configuration in which a potential (Vsig) of the source line SL(j) is changed after the transistor N1 is switched OFF.

The pixel memory MR of FIG. 4 is identical to that of the present Example 3. The source line SL(j) is connected to the drive signal generation circuit/video signal generation circuit 4 via a sampling switch SMP. The node PIX, the node MRY, and the data transfer control line DT(i) in FIG. 4 are each a nodeA, a nodeB, and a nodeC, respectively.

Figure 10:
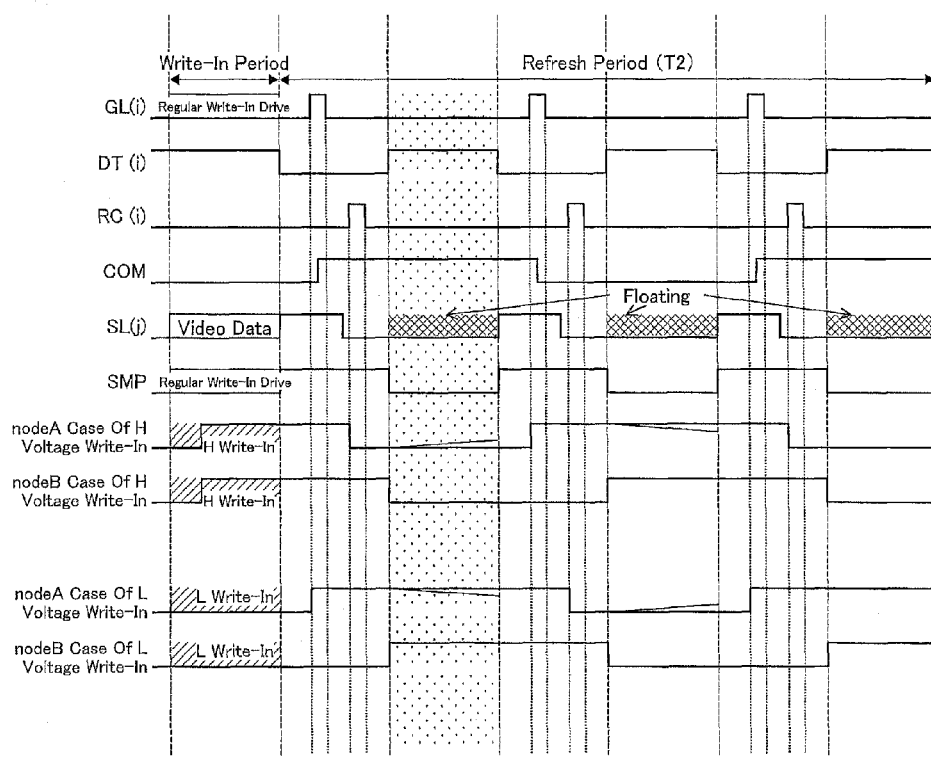
FIG. 10

As illustrated in FIG. 10, the refresh period includes a given period tx. The period tx is a period in which the first data storage section DS1 and the second data storage section DS2 hold identical binary logic levels in a state in which the refresh output control section RS1 is disconnected from the output terminal OUT1, the potential of the data transfer control line DT(i) is made to be either of the first potential level or the second potential level (e.g. Low in FIG. 10) and the other one of the first potential level and the second potential level (e.g. High in FIG. 10) is supplied to the source line SL(j) from the drive signal generation circuit/video signal generation circuit 4, and thereafter the source line SL(j) is made to be in a floating state.

Figure 11:
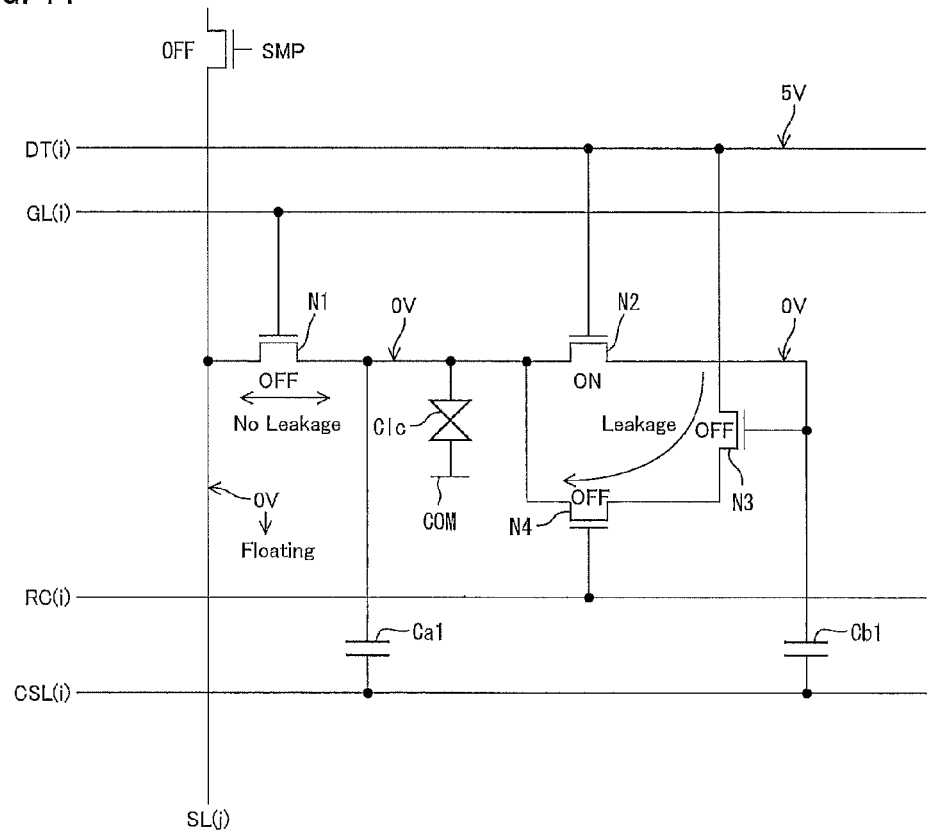
FIG. 11

FIG. 11 illustrates a leakage state with respect to the nodeA in the period tx in a case where the nodeA is 0 V, the nodeB is 0 V, and the nodeC is 5 V, and in a state in which the source line SL(j) is made to be in a floating state from 0 V. No leakage current occurs in the transistor N1, however a leakage current directed from the nodeC to the nodeA occurs in the transistors N3 and N4.

Figure 12:
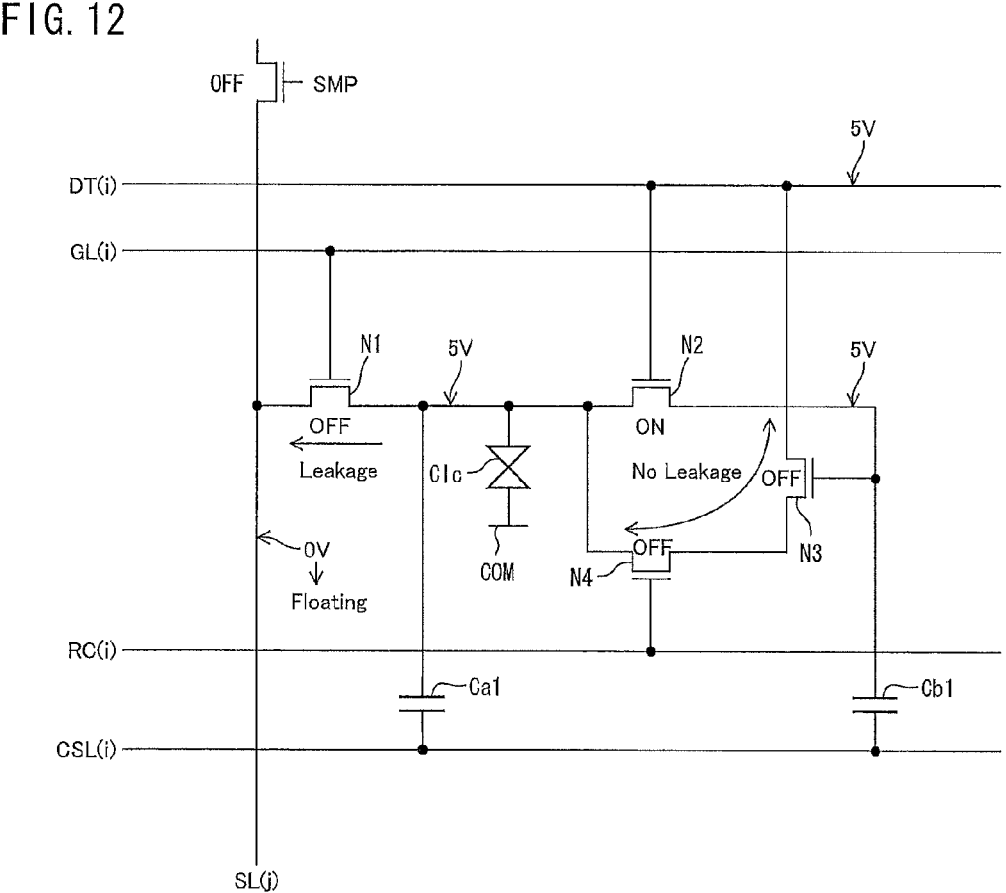
FIG. 12

FIG. 12 illustrates a leakage state with respect to the nodeA in the period tx in a case where the nodeA is 5 V, the nodeB is 5 V, and the nodeC is 5 V, and in a state in which the source line SL(j) is made to be in the floating state from 0 V. A leakage current directed from the nodeA to the source line SL(j) occurs in the transistor N1, whereas no leakage current occurs in the transistors N3 and N4.

According to the present Example 3, leakage occurring to the storage nodes are balanced, between a case in which the storage node of the binary logic level of the first data storage section DS1 stores the first potential level and in a case in which the storage node of the binary logic level of the first data storage section DS1 stores the second potential level.

Hence, it is possible to fabricate a memory device including: two storage sections that store a binary logic level corresponding to data written in; a data transfer section transferring the binary logic level between the two storage sections; and a circuit that carries out a refresh operation of one of the two storage sections based on the binary logic level stored in the other one of the two storage sections, and which memory device can balance, between different circuit states, a leakage amount in a first storage section which writes in the binary logic level from a line from which the binary logic level is supplied to a memory cell.

Moreover, the source line SL(j) is made to float; this allows for reducing the leakage current, thereby making it possible to achieve reduction in electricity consumption.

While the refresh output control section RS1 is disconnected from the output terminal OUT1, during the predetermined period tx, the first data storage section DS1 and the second data storage section DS2 may store identical binary logic levels, the potential of the data transfer control line DT(i) may be one of the first potential level or the second potential level (e.g. Low in FIG. 10), and the drive signal generation circuit/video signal generation circuit 4 may continuously supply to the source line SL(j) the other one of the first potential level and the second potential level (e.g. High in FIG. 10).

Figure 13:
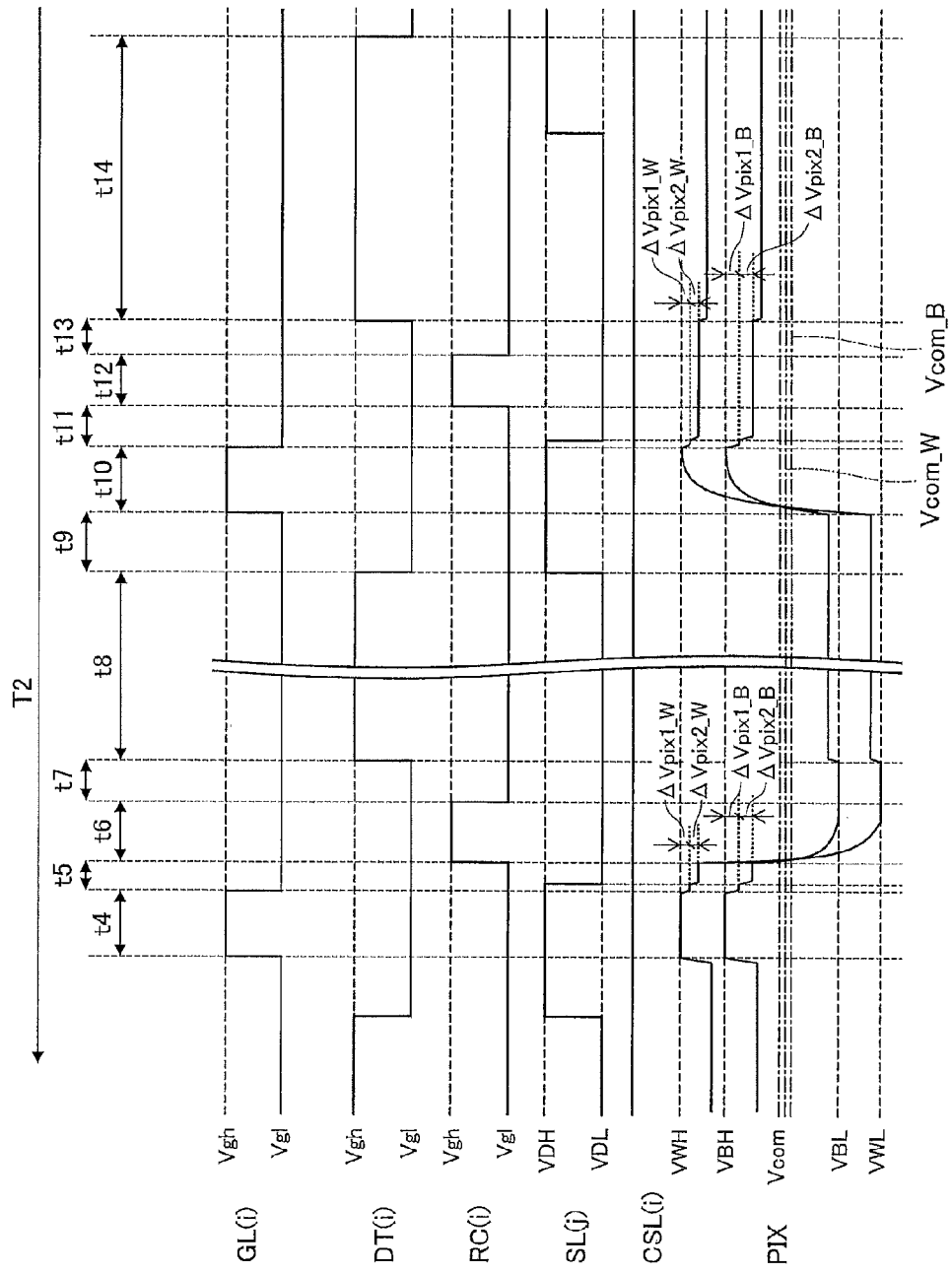
FIG. 13

In the liquid crystal display device which carries out the foregoing operations, a change in pixel potential caused by a feed-through voltage due to the change in potential of the source line SL(j) may occur, other than that caused by the feed-through voltage due to the gate-drain parasitic capacitor Cgd of the transistor N1. These feed-through voltages have not been taken into consideration in FIG. 10, and thus the pixel potential (potential of node PIX) is of an ideal waveform even when the transistor N1 is switched off. However, practically, the pixel potential varies due to the change in potentials of the parasitic capacitor Cgd of the transistor N1 and the source line SL(j); this causes the optimum counter potential Vcom to shift. FIG. 13 illustrates a case in which the optimum counter potentials Vcom disagree in the pixel memory MR of FIG. 4. FIG. 13 illustrates changes in the potentials of the gate line GL(i), the data transfer section DT(i), the refresh output control line RC(i), the source line SL(j), the CS line CSL(i), and the node PIX, in the refresh period T2 in FIG. 10. As illustrated in FIG. 13, first, when the gate line GL(i) changes from the High potential to the Low potential (the transistor N1 switches OFF), the potential of the node PIX decreases by ΔVpix1, caused by the parasitic capacitor Cgd of the transistor N1. Next, when the potential Vsig of the source line SL(j) changes from High to Low, the potential of the node PIX further decreases by ΔVpix2. This causes the optimum counter potential Vcom to shift off from the center potential. Moreover, the optimum counter potential (Vcom_W) in the case of writing in a potential corresponding to the white display disagrees with the optimum counter potential (Vcom_B) in the case of writing in a potential corresponding to the black display. This causes the problem that the flicker occurs, thereby causing a decrease in display quality.

Figure 14:
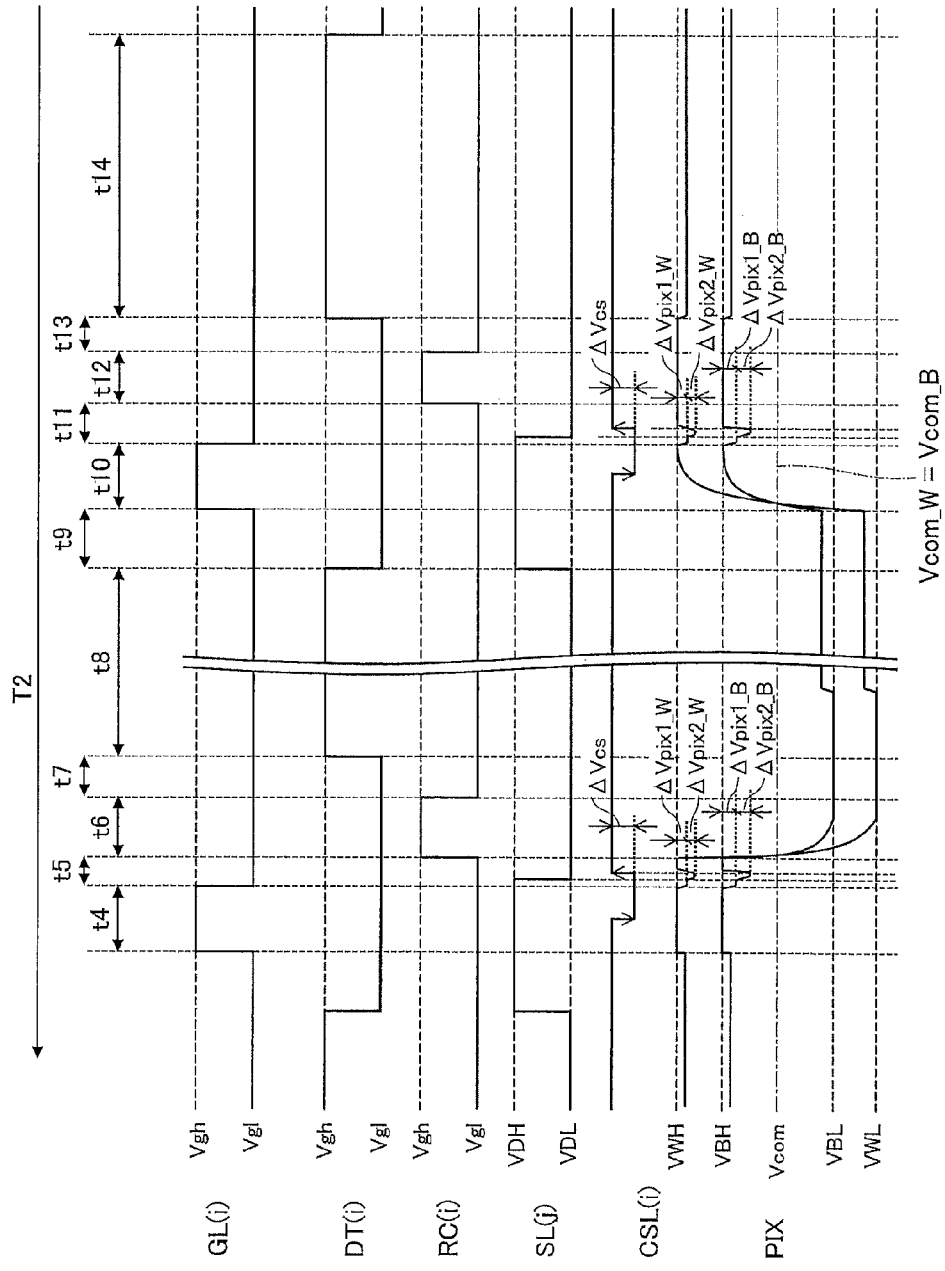
FIG. 14

The present Example 2 describes a configuration which allows for correcting a change in pixel potential due to a feed-through voltage caused by the gate-drain parasitic capacitor Cgd of the transistor N1 and due to a feed-through voltage caused by the change in potential of the source line SL(j). FIG. 14 is a timing chart illustrating operations corresponding to a pixel (FIG. 4) of the present liquid crystal display device. For easy explanation, the description provided below uses the operations in which the idea of the present invention is applied to the pixel illustrated in FIG. 16 as an example, to compare with the conventional operations illustrated in FIG. 18. The description of the operations illustrated in FIG. 14 is described later.

Figure 15:
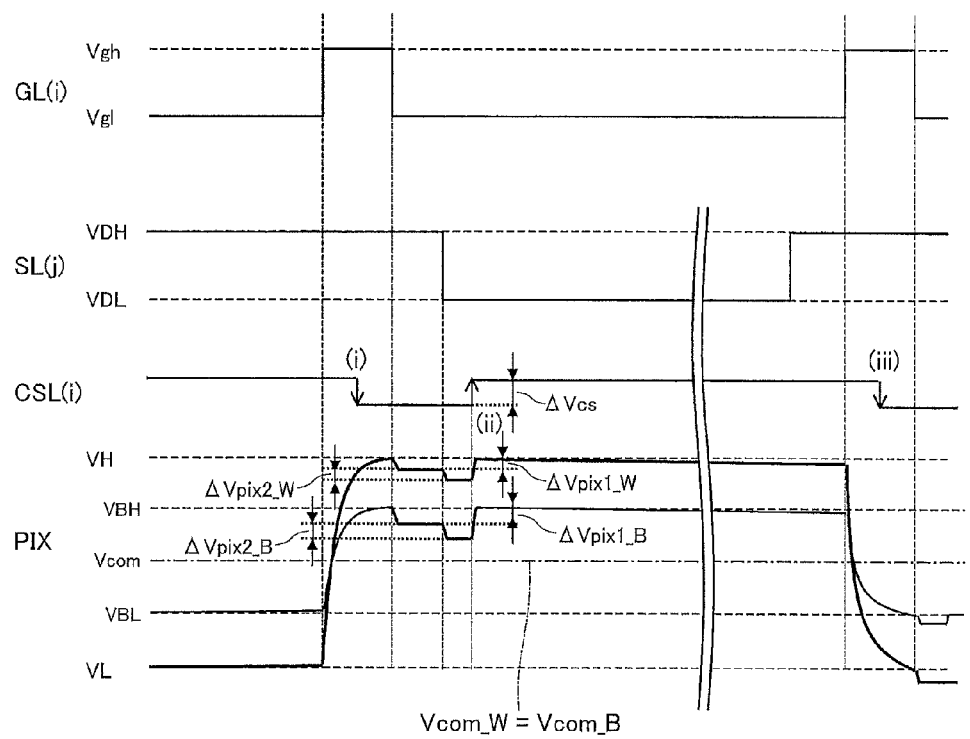
FIG. 15

FIG. 15 is a timing chart illustrating how a potential (pixel potential) of the pixel electrode 14 (see FIG. 16) changes in a case in which the idea of the present invention is applied to the operations of FIG. 18. FIG. 15 illustrates a state of operations in which (a) the TFT 13 is switched on to supply a data signal potential from the source line 11 to the pixel electrode 14, (b) the TFT 13 is switched off after the data signal potential is supplied, and (c) the supplied data signal potential is held until the TFT 13 is switched on the next time. As illustrated in FIG. 15, first, the potential (CS potential) of the CS line CSL(i) (CS line 15) is decreased by ΔVcs ((i) of FIG. 15) during a period in which the potential of the gate line GL(i) (gate line 12) is High. At this time, the transistor 13 is in the ON state; the pixel electrode 14 is connected to the source line 11 via the transistor 13. Accordingly, even if the CS potential decreases (ΔVcs), the potential (pixel potential) (High potential) of the pixel electrode 14 does not change.

Subsequently, when the potential of the gate line GL(i) becomes Low, the transistor 13 switches OFF, and the pixel electrode 14 is in the floating state. This causes the pixel potential to decrease by ΔVpix1 (feed-through voltage), due to the parasitic capacitor Cgd formed between the gate electrode g and the drain electrode d of the transistor 13. Next, after the potential (Vsig) of the source line SL(j) changes from High to Low, the pixel potential decreases by a further ΔVpix2 (feed-through voltage).

Thereafter, the CS potential is increased by ΔVcs, thereby making the potential be back to its original value ((ii) of FIG. 15). At this time, the transistor 13 is in the OFF state, and the pixel electrode 14 is in the floating state while an electric charge is maintained. Hence, by increasing the CS potential by ΔVcs, the pixel potential rises.

The rising direction of the pixel potential illustrated in (ii) of FIG. 15 is an opposite direction to a feed-through varying direction. As a result, the feed-through voltage is corrected to its voltage that should be originally charged.

The variable voltage (feed-through voltage) ΔVpix of the pixel potential can be represented by the following equations. Namely, after the first feed-through (feed-through caused by the parasitic capacitor Cgd of the transistor N1) occurs, the gate line GLi is in the OFF state until the second feed-through (feed-through due to a potential change of the source line SL(j)) occurs; this allows for maintaining a constant pixel potential. Accordingly, the feed-through voltage ΔVpix is represented by a total of the first and second feed-through voltages. The ΔVpix1, ΔVpix2, and ΔVpix are represented by the following equations:

$$\Delta V\text{pix1} = \Delta Vg \times Cgd/(Clc+Ccs+Cgd+Csd)$$

$$\Delta V\text{pix2} = \Delta V\text{sig} \times Csd/(Clc+Ccs+Cgd+Csd)$$

$$\Delta V\text{pix} = \Delta V\text{pix1} + \Delta V\text{pix2} = (\Delta Vg \times Cgd + \Delta V\text{sig} \times Csd)/(Clc+Ccs+Cgd+Csd) \quad (8)$$

Moreover, a voltage (correction voltage) ΔVpix' that is corrected (risen) by adjusting the CS potential (increased by ΔVcs) is represented by the following equation:

$$\Delta V\text{pix}' = \Delta Vcs \times Ccs/(Clc+Ccs+Cgd+Csd) \quad (9)$$

If for example as an ideal state a completely corrected feed-through voltage (ΔVpix) is assumed, the following equation would be accomplished:

$$\Delta V\text{pix} = \Delta V\text{pix}' \quad (10)$$

Accordingly based on the equations (8) to (10), the adjusting voltage ΔVcs of the CS potential is represented by the following equation:

$$\Delta Vcs = \Delta Vg \times Cgd/Ccs + \Delta V\text{sig} \times Csd/Ccs \quad (11)$$

Moreover, similarly with the idea of the equation (7), the following equations are accomplished, provided that ΔVcs_gd is an adjusting voltage of the feed-through voltage ΔVpix1 caused by the parasitic capacitor Cgd of the transistor N1, and ΔVcs_sd is an adjusting voltage of the feed-through voltage ΔVpix2 caused by the change in potential of the source line SL(j):

$$\Delta Vcs\_gd = \Delta Vg \times Cgd/Ccs \quad (12)$$

$$\Delta Vcs\_sd = \Delta V\text{sig} \times Csd/Ccs \quad (13)$$

Based on the equations (9) to (11), the following equation is further accomplished:

$$\Delta Vcs = \Delta Vcs\_gd + \Delta Vcs\_sd \quad (14)$$

Hence, with use of the equation (14), it is possible to calculate an entire adjusting voltage (ΔVcs) by calculating each independent adjusting voltage (ΔVcs_gd, ΔVcs_sd) and then calculating a linear total, even in the case in which the effect of a plurality of parasitic capacitors is taken into account. Further, as seen from the equations (12) to (14), the liquid crystal capacitor Clc that varies due to the on and off of the liquid crystal is eliminated. Therefore, it is possible to satisfy an ideal condition of the equation (10) regardless of the on and off of the liquid crystal, as long as the adjusting voltage (ΔVcs) of the CS potential set for correcting the feed-through voltage (ΔVpix) is set to a desired value by referring to the equations (12) and (13). That is to say, since it is possible to correct the decrease (feed-through voltage ΔVpix) in the pixel potential, the optimum counter potentials Vcom (VcomW, VcomB) can be agreed between when the liquid crystal is on and when the liquid crystal is off, without requiring an adjustment of the counter voltage Vcom. This allows for holding down the occurrence of the flicker.

A specific example is described below. In a case in which the liquid crystal capacitor Clc_on is 100 fF, the liquid crystal capacitor Clc_off is 50 fF, the storage capacitor Ccs is 200 fF, the gate-drain parasitic capacitor Cgd is 10 fF, the source-drain parasitic capacitor Csd is 10 fF, ΔVg=Vgh−Vgl=15 V, and ΔVsig=5 V, the adjusting voltage ΔVcs of the CS potential is, based on the equations (12) to (14), ΔVcs=1.0 V.

The feed-through voltages ΔVpix_on and ΔVpix_off of the white display and the black display, which are caused by the parasitic capacitor Cgd of the transistor N1 and a potential change of the source line SL(j) are, based on the equation (8), ΔVpix_on=0.625 V and ΔVpix_off=0.741 V.

On the other hand, the correction voltages ΔVpix'_on and ΔVpix'_off of the white display and the black display are, based on the equation (9), ΔVpix'_on=0.625 V and ΔVpix'_off=0.741 V.

As described above, even though there is a change in pixel potential (feed-through voltage) caused by a plurality of causes, correction in accordance with that change is possible. Namely, by setting the adjusting voltage (falling/rising voltage) ΔVcs of the CS potential as 1.0 V, it is possible to correct (make back) the reduced pixel potential (feed-through voltage ΔVpix_on=0.625 V, ΔVpix_off=0.741 V); there is no need to adjust the counter potential Vcom, and it is possible to have the optimum counter potential Vcom when a voltage is applied to the liquid crystal agree with the optimum counter potential Vcom when no voltage is applied to the liquid crystal. Of course, a correction corresponding to this is possible with a halftone. Hence, it is possible to hold down the occurrence of the flicker or the like caused by the difference in the liquid crystal capacitor Clc between when the liquid crystal is on and when the liquid crystal is off.

The following description explains an operation corresponding to the pixel (FIG. 4) of the present liquid crystal display device, with reference to FIG. 14.

FIG. 14 specifically illustrates the changes in potentials of the gate line GL(i), the data transfer section DT(i), the refresh output control line RC(i), the source line SL(j), the CS line CSL(i), and the node PIX change, in the refresh period T2 of FIG. 10.

First, in the period t4, the potential of the gate line GL(i) becomes High, the potential of the data transfer control line DT(i) is maintained Low, and the potential of the refresh output control line RC(i) is maintained Low. This switches the transistor N1 into the ON state, which makes the switch circuit SW1 be in a conductive state. As a result, a High potential (VHW) corresponding to the white display is written into the node PIX from the source line SL(j). While the transistor N1 is in the ON state, the potential of the CS line CSL(i) decreases by ΔVcs ((i) of FIG. 14).

In the period t5, the potential of the gate line GL(i) becomes Low, the potential of the data transfer control line DT(i) is maintained Low, and the potential of the refresh output control line RC(i) is maintained Low. This makes the transistor N1 be in the OFF state, which causes the switch circuit SW1 to be in the disconnected state. This causes the node PIX to be disconnected from the source line SL(j) and be in a floating state. The potential of the node PIX decreases by ΔVpix_W1 from VWH caused by the gate-drain parasitic capacitor Cgd in an instant the transistor N1 switches OFF. Subsequently, after the potential of the source line SL(j) changes from High to Low, the pixel potential further decreases by ΔVpix_W2 (feed-through voltage).

Thereafter, the potential of the CS line CSL(i) increases by ΔVcs ((ii) of FIG. 14). This causes the potential of the node PIX to rise, and be back to its original potential VWH.

In period t6, the potential of the gate line GL(i) is maintained Low, the potential of the data transfer control line DT(i) is maintained Low, and the potential of the refresh output control line RC(i) becomes High. This makes the transistor N4 be in the ON state, and the refresh output control section RS1 carries out the first operation. Moreover, since the potential of the node MRY is High, the transistor N3 is in the ON state and hence the refresh output control section RS1 is in the active state; a Low potential (VWL) is supplied to the node PIX from the data transfer control line DT (i) via the transistors N3 and N4.

Similar operations as FIG. 10 are carried out in period t7 to period t9.

In the period t10 the potential of the gate line GL(i) becomes High, the potential of the data transfer control line DT(i) is maintained Low, and the potential of the refresh output control line RC(i) is maintained Low. This makes the transistor N1 be in the ON state, which makes the switch circuit SW1 be in a conductive state and a High potential is again written into the node PIX from the source line SL(j). Moreover, the potential of the CS line CSL(i) decreases by ΔVcs ((iii) of FIG. 14).

In the period t11, the potential of the gate line GL(i) becomes Low, the potential of the data transfer control line DT(i) is maintained Low, and the potential of the refresh output control line RC(i) is maintained Low. This causes the transistor N1 to be in the OFF state, which makes the switch circuit SW1 be in the disconnected state. As a result, the node PIX is disconnected from the source line SL(j) and is in the floating state. The potential of the node PIX is reduced by ΔVpix_W1 from VWH in an instant the transistor N1 switches OFF, caused by the gate-drain parasitic capacitor Cgd. Subsequently, as the potential of the source line SL(j) changes from High to Low, the pixel potential decreases by a further ΔVpix_W2 (feed-through voltage).

Thereafter, the potential of the CS line CSL(i) rises by ΔVcs ((iv) of FIG. 14). This causes the potential of the node PIX to rise, and be back to the original potential VWH.

In the period t12, the potential of the gate line GL(i) is maintained Low, the potential of the data transfer control line DT(i) is maintained Low, and the potential of the refresh output control line RC(i) becomes High. This makes the transistor N4 be in the ON state, and the refresh output control section RS1 is in a state in which the first operation is to be carried out. Moreover, since the potential of the node MRY is Low, the transistor N3 is in the OFF state. This makes the refresh output control section RS1 to be in the inactive state, and the output is stopped. Therefore, the node PIX is maintained as High (VWH).

Operations similar to FIG. 10 are carried out in the period t13 to period t14.

In a case in which a High potential (VHB) corresponding to the black display is written into the node PIX from the source line SL(j), the potential of the node PIX decreases from VWB by $\Delta Vpix\_B1$ in an instant the transistor N1 switches OFF (period t5, period t11), caused by the gate-drain parasitic capacitor Cgd. Thereafter, when the potential of the source line SL(j) changes from High to Low, the pixel potential decreases by a further $\Delta Vpix\_B2$ (feed-through voltage). The feed-through voltage changes depending on the liquid crystal capacitor, so therefore, based the equations (2) and (3), the following relationship is satisfied:

$$\Delta Vpix\_W(\Delta Vpix\_W1+\Delta Vpix\_W2)<\Delta Vpix\_B (\Delta Vpix\_B1+\Delta Vpix\_B2).$$

In this case also, when the potential of the CS line CSL(i), which is decreased in the period in which the gate line GL(i) is in the High potential, increases by $\Delta Vcs$ ((ii), (iv) of FIG. 14), the potential of the node PIX rises and is made back to the original potential VWB (period t5, period t11).

As described above, similarly with Example 1, the liquid crystal display device according to the present Example 2 has a configuration in which, during a period (T2: data holding period) in which image data written into a pixel is held and refresh operation is carried out while inverting a polarity of the image data, the CS line CSL(i) is decreased by a given potential while the gate line GL(i) is active, and thereafter the potential of the CS line CSL(i) is made back to its original potential (is risen by the given potential) during a period after the gate line GL(i) is made inactive but before the refresh output control line RC(i) is made active (period t5, period t11). This allows for having the potential (pixel potential) of the node PIX caused by the feed-through voltage due to the gate-drain parasitic capacitor Cgd of the transistor N1 and by the feed-through voltage due to the change in potential of the source line SL(j) be made back to its original potential. Accordingly, it is possible to set the optimum counter potential (center potential) without adjusting the counter potential Vcom. Moreover, it is possible to set a common optimum counter potential regardless of the data signal potential supplied to the source line SL(j). This allows for reducing the flicker, thereby improving display quality.

Examples 1 and 2 exemplify a fixed potential (counter potential Vcom) of the counter electrode (common electrode) COM, however the present invention is not limited to this. As illustrated in FIGS. 5 and 6, the configuration may be made so that the potential varies with respect to AC drive between the two values of the High potential and the Low potential. In this case, the potential of the counter electrode may be alternated between the two values every refresh operation. Moreover, both the two values may be greater than a minimum value of the data signal potential and smaller than a maximum value of the data signal potential.

In order to achieve the object, a liquid crystal display device of the present invention is a memory liquid crystal display device that carries out a refresh operation in a period in which data is held after a data signal potential is written in, the device including: data signal lines; scanning signal lines; storage capacitor lines; data transfer lines; refresh lines; pixel electrodes; a counter electrode; first transistors, each of whose control terminal is connected to a respective one of the scanning signal lines; second transistors, each of whose control terminal is connected to a respective one of the data transfer lines; third transistors, each of whose control terminal is connected to a respective one of the pixel electrodes via a respective one of the second transistors; fourth transistors, each of whose control terminal is connected to a respective one of the refresh lines; first storage capacitors, each of which is connected to the pixel electrode; and second storage capacitors, each of which is connected to a respective one of the pixel electrodes via a respective one of the second transistors, each of the pixel electrodes being connected to a respective one of the data signal lines via a respective one of the first transistors and being connected to a respective one of the data transfer lines via a respective one of the third transistors and a respective one of the fourth transistors, and during the period in which the data is held, a storage capacitor line signal supplied to the storage capacitor lines once being decreased in potential while the scanning signal lines are simultaneously active, and having the potential of the storage capacitor line signal be back to its original potential during a period after the scanning signal lines are made simultaneously inactive but before the refresh lines are made active.

According to the configuration, in the period in which the data is held, a constant potential causing the third transistor to switch on is provided to the data signal line, and the scanning signal line is once made active while the data transfer line is made inactive and thereafter the refresh line is made active, to appropriately carry out the refresh operation. Furthermore, the potential of the pixel electrode (pixel potential) that is decreased due to the parasitic capacitor of the transistor can be made back to its original potential, by once decreasing the potential of the storage capacitor line signal supplied to the storage capacitor line while the scanning signal lines are made simultaneously active, and thereafter making the potential of the storage capacitor line signal be back to its original potential during a period after the scanning signal lines are made simultaneously inactive but before the refresh lines are made active. Hence, it is possible to set an optimum counter potential (center potential) without adjusting a potential Vcom of the counter electrode. Moreover, it is possible to set a common optimum counter potential, regardless of the data signal potential (for example, a potential corresponding to a black display and a potential corresponding to a white display). This allows for reducing the flicker, thereby being able to improve the display quality.

The present liquid crystal display device may be configured in such a manner that the potential of the storage capacitor line signal varies by a degree set in accordance with a degree of decrease in potential of the pixel electrodes.

The present liquid crystal display device may be configured in such a manner that the potential of the storage capacitor line signal varies by a degree set in accordance with a decrease in potential of the pixel electrodes caused by parasitic capacitors between gate terminals and drain terminals of the first transistors, when the first transistors are switched OFF.

The present liquid crystal display device may be configured in such a manner that the potential of the storage capacitor line signal varies by a degree set in accordance with a degree of decrease in potential of the pixel electrodes caused by (a) parasitic capacitors between gate terminals and drain terminals of the first transistors when the first transistors are switched OFF and (b) variation in data signal potential that is supplied to the data signal lines during the period in which the data is held.

The present liquid crystal display device may be configured in such a manner that while the data signal potential is written in, the data transfer lines are made active and the scanning signal lines are successively selected while the data signal potential is outputted to the data signal lines.

The present liquid crystal display device may be configured in such a manner that during the period in which data is held, the data signal lines are provided with a constant potential that makes the third transistors be switched ON.

The present liquid crystal display device may be configured in such a manner that during the period in which data is held, the refresh operation is carried out by once activating the scanning signal lines simultaneously and thereafter activating the refresh lines simultaneously, while the data transfer lines are inactive.

The present liquid crystal display device may be configured in such a manner that the counter electrode has its potential be alternated between two values each time the refresh operation is carried out.

The present liquid crystal display device may be configured in such a manner that the two values are both larger than a minimum value of the data signal potential but are smaller than a maximum value of the data signal potential.

In order to attain the object, a method of driving the liquid crystal display device of the present invention is a method of driving a memory liquid crystal display device that carries out a refresh operation in a period in which data is held after a data signal potential is written in, the device including: data signal lines; scanning signal lines; storage capacitor lines; data transfer lines; refresh lines; pixel electrodes; a counter electrode; first transistors, each of whose control terminal is connected to a respective one of the scanning signal lines; second transistors, each of whose control terminal is connected to a respective one of the data transfer lines; third transistors, each of whose control terminal is connected to a respective one of the pixel electrodes via a respective one of the second transistors; fourth transistors, each of whose control terminal is connected to a respective one of the refresh lines; first storage capacitors, each of which is connected to a respective one of the pixel electrodes; and second storage capacitors, each of which is connected to a respective one of the pixel electrodes via a respective one of the second transistors, each of the pixel electrodes being connected to a respective one of the data signal lines via a respective one of the first transistors and being connected to a respective one of the data transfer lines via a respective one of the third transistors and a respective one of the fourth transistors, the method including:

while the data signal potential is written in, (i) activating the data transfer lines, and (ii) successively selecting the scanning signal lines while outputting the data signal potential to the data signal lines;

during the period in which data is held, (iii) providing a constant potential which makes the third transistors be switched ON, and (iv) once activating the scanning signal lines simultaneously and thereafter activating the refresh lines, while the data transfer lines are inactive; and (v) once decreasing the potential of the storage capacitor line signal supplied to the storage capacitor lines while the scanning signal lines are made simultaneously active; and (vi) making the potential of the storage capacitor line signal be back to its original potential during a period after the scanning signal lines are made simultaneously inactive but before the refresh lines are made active.

According to the configuration, an effect similar to the liquid crystal display device can be achieved.

The invention being thus described, it will be obvious that the same way may be varied in many ways. Such variations are not to be regarded as a departure from the spirit and scope of the invention, and all such modifications as would be obvious to one skilled in the art are intended to be included within the scope of the following claims.

Industrial Applicability

The present invention can be suitably used for displays for a portable phone, and the like.

REFERENCE SIGNS 1 liquid crystal display device
2 gate driver/CS driver (scanning signal line drive circuit/storage capacitor line drive circuit)
3 control signal buffer circuit
4 drive signal generation circuit/video signal generation circuit (display control circuit)
5 demultiplexer
6 pixel array
40 pixel
64 counter electrode (common electrode)
GL gate line (scanning signal line)
CSL CS line (storage capacitor line)
DT data transfer control line (data transfer line)
RC refresh output control line (refresh line)
SL source line (data signal line)
MR pixel memory (memory circuit)
SW1 switch circuit
DS1 first data storage section
TS1 data transfer section
DS2 second data storage section
RS1 refresh output control section
VS1 supply source
N1-N4 transistor
N-channel field effect transistor)
P1 transistor
(P-channel field effect transistor, fifth transistor)
N1 transistor (first transistor)
N2 transistor (second transistor)
N3 transistor (third transistor)
N4 transistor (fourth transistor)
Ca1 capacitor (first storage capacitor)
Cb1 capacitor (second storage capacitor)
PIX potential of pixel electrode (pixel potential

The invention claimed is:

1. A memory liquid crystal display device that carries out a refresh operation in a period in which data is held after a data signal potential is written in, the device comprising:
    data signal lines;
    scanning signal lines;
    storage capacitor lines;
    data transfer lines;
    refresh lines;
    pixel electrodes;
    a counter electrode;
    first transistors, each of whose control terminal is connected to a respective one of the scanning signal lines;
    second transistors, each of whose control terminal is connected to a respective one of the data transfer lines;
    third transistors, each of whose control terminal is connected to a respective one of the pixel electrodes via a respective one of the second transistors;
    fourth transistors, each of whose control terminal is connected to a respective one of the refresh lines;
    first storage capacitors, each of which is connected to a respective one of the pixel electrodes; and second storage capacitors, each of which is connected to a respective one of the pixel electrodes via a respective one of the second transistors, each of the pixel electrodes being connected to a respective one of the data signal lines via a respective one of the first transistors and being connected to a respective one of the data transfer lines via a respective one of the third transistors and a respective one of the fourth transistors, and during the period in which the data is held, a storage capacitor line signal supplied to the storage capacitor lines once being decreased in potential while the scanning signal lines are simultaneously active, and having the potential of the storage capacitor line signal be back to its original potential during a period after the scanning signal lines are made simultaneously inactive but before the refresh lines are made active.

2. The liquid crystal display device according to claim 1, wherein
the potential of the storage capacitor line signal varies by a degree set in accordance with a degree of decrease in potential of the pixel electrodes.

3. The liquid crystal display device according to claim 1, wherein
the potential of the storage capacitor line signal varies by a degree set in accordance with a decrease in potential of the pixel electrodes caused by parasitic capacitors between gate terminals and drain terminals of the first transistors, when the first transistors are switched OFF.

4. The liquid crystal display device according to claim 1, wherein
the potential of the storage capacitor line signal varies by a degree set in accordance with a degree of decrease in potential of the pixel electrodes caused by (a) parasitic capacitors between gate terminals and drain terminals of the first transistors when the first transistors are switched OFF and (b) variation in data signal potential that is supplied to the data signal lines during the period in which the data is held.

5. The liquid crystal display device according to claim 1, wherein
while the data signal potential is written in, the data transfer lines are made active and the scanning signal lines are successively selected while the data signal potential is outputted to the data signal lines.

6. The liquid crystal display device according to claim 5, wherein
during the period in which data is held, the data signal lines are provided with a constant potential that makes the third transistors be switched ON.

7. The liquid crystal display device according to claim 6, wherein
during the period in which data is held, the refresh operation is carried out by once activating the scanning signal lines simultaneously and thereafter activating the refresh lines simultaneously, while the data transfer lines are inactive.

8. The liquid crystal display device according to claim 7, wherein
the counter electrode has its potential be alternated between two values each time the refresh operation is carried out.

9. The liquid crystal display device according to claim 8, wherein
the two values are both larger than a minimum value of the data signal potential but are smaller than a maximum value of the data signal potential.

10. A method of driving a memory liquid crystal display device that carries out a refresh operation in a period in which data is held after a data signal potential is written in,
the device comprising: data signal lines; scanning signal lines; storage capacitor lines; data transfer lines; refresh lines; pixel electrodes; a counter electrode; first transistors, each of whose control terminal is connected to a respective one of the scanning signal lines; second transistors, each of whose control terminal is connected to a respective one of the data transfer lines; third transistors, each of whose control terminal is connected to a respective one of the pixel electrodes via a respective one of the second transistors; fourth transistors, each of whose control terminal is connected to a respective one of the refresh lines; first storage capacitors, each of which is connected to the pixel electrodes; and second storage capacitors each of which is connected to a respective one of the pixel electrodes via a respective one of the second transistors, each of the pixel electrodes being connected to a respective one of the data signal lines via a respective one of the first transistors and being connected to a respective one of the data transfer lines via a respective one of the third transistors and a respective one of the fourth transistors, the method comprising:
while the data signal potential is written in, (i) activating the data transfer lines, and (ii) successively selecting the scanning signal lines while outputting the data signal potential to the data signal lines;

during the period in which data is held, (iii) providing a constant potential which makes the third transistors be switched ON, and (iv) once activating the scanning signal lines simultaneously and thereafter activating the refresh lines, while the data transfer lines are inactive; and (v) once decreasing the potential of the storage capacitor line signal supplied to the storage capacitor lines while the scanning signal lines are made simultaneously active; and (vi) making the potential of the storage capacitor line signal be back to its original potential during a period after the scanning signal lines are made simultaneously inactive but before the refresh lines are made active.

* * * * *